United States Patent
Fujita et al.

(10) Patent No.: US 9,594,296 B2
(45) Date of Patent: Mar. 14, 2017

(54) ILLUMINATION DEVICE INCLUDING A WAVELENGTH CONVERTER

(71) Applicants: Kazuhiro Fujita, Tokyo (JP); Tatsuya Takahashi, Tokyo (JP); Toshiharu Murai, Kanagawa (JP); Ikuo Maeda, Kanagawa (JP); Takehiro Nishimori, Kanagawa (JP)

(72) Inventors: Kazuhiro Fujita, Tokyo (JP); Tatsuya Takahashi, Tokyo (JP); Toshiharu Murai, Kanagawa (JP); Ikuo Maeda, Kanagawa (JP); Takehiro Nishimori, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 29 days.

(21) Appl. No.: 14/425,376

(22) PCT Filed: Sep. 12, 2013

(86) PCT No.: PCT/JP2013/075385
§ 371 (c)(1),
(2) Date: Mar. 3, 2015

(87) PCT Pub. No.: WO2014/046219
PCT Pub. Date: Mar. 27, 2014

(65) Prior Publication Data
US 2015/0253653 A1    Sep. 10, 2015

(30) Foreign Application Priority Data

Sep. 18, 2012 (JP) ................. 2012-204918
Apr. 26, 2013 (JP) ................. 2013-093578

(51) Int. Cl.
*G03B 21/20* (2006.01)
*G02B 27/10* (2006.01)
(Continued)

(52) U.S. Cl.
CPC ............. *G03B 21/204* (2013.01); *F21V 9/08* (2013.01); *F21V 9/16* (2013.01); *G02B 13/16* (2013.01);
(Continued)

(58) Field of Classification Search
CPC .. F21V 9/08; F21V 9/16; G02B 13/16; G02B 26/008; G02B 27/102; G02B 27/143;
(Continued)

(56) References Cited

U.S. PATENT DOCUMENTS 6,309,078 B1   10/2001  Dromaretsky et al.
2002/0068020 A1* 6/2002  Stuckey ................ G02B 21/06
                                                          422/82.08
(Continued)

FOREIGN PATENT DOCUMENTS

CN    101937166 A    1/2011
CN    102419509 A    4/2012
(Continued)

OTHER PUBLICATIONS

Extended European Search Report issued Jun. 26, 2015 in Patent Application No. 13838899.6.
(Continued)

*Primary Examiner* — Sultan Chowdhury
*Assistant Examiner* — Magda Cruz
(74) *Attorney, Agent, or Firm* — Oblon, McClelland, Maier & Neustadt, L.L.P.

(57) ABSTRACT

An illumination device includes an excitation light source which emits excitation light, a wavelength converter which generates fluorescent light having a wavelength different from that of the excitation light through the excitation of the excitation light and a light path-splitting member including a first filter and a second filter arranged to alternately come across a light path of the excitation light, wherein the first
(Continued)

filter reflects one of the excitation light and the fluorescent light and transmits the other of the excitation light and the fluorescent light, the second filter transmits light reflected by the first filter and reflects light transmitted through the first filter, and the wavelength converter is disposed in a reflection light path or a transmission light path of the excitation light.

11 Claims, 31 Drawing Sheets

(51) Int. Cl.
    *H04N 9/31*     (2006.01)
    *G03B 33/08*     (2006.01)
    *G02B 26/00*     (2006.01)
    *F21V 9/08*     (2006.01)
    *F21V 9/16*     (2006.01)
    *G02B 13/16*     (2006.01)
    *G02B 27/14*     (2006.01)
    *F21Y 101/00*     (2016.01)

(52) U.S. Cl.
    CPC .......... *G02B 26/008* (2013.01); *G02B 27/102* (2013.01); *G02B 27/143* (2013.01); *G03B 33/08* (2013.01); *H04N 9/3111* (2013.01); *H04N 9/3158* (2013.01); *H04N 9/3164* (2013.01); *F21Y 2101/00* (2013.01); *F21Y 2115/30* (2016.08); *G02B 27/141* (2013.01)

(58) Field of Classification Search
    CPC .... G02B 27/141; G03B 21/204; G03B 33/08; H04N 9/3111; H04N 9/3158; H04N 9/3164; F21Y 2101/02; F21Y 2101/025
    See application file for complete search history.

(56) References Cited

U.S. PATENT DOCUMENTS

| | | | |
|---|---|---|---|
| 2006/0007407 A1* | 1/2006 | Matsui | G02B 26/008 353/84 |
| 2010/0238412 A1 | 9/2010 | Kurosaki | |
| 2010/0328625 A1 | 12/2010 | Miyazaki et al. | |
| 2011/0043765 A1 | 2/2011 | Shibasaki | |
| 2011/0205502 A1* | 8/2011 | Kato | G03B 21/14 353/84 |
| 2012/0026472 A1 | 2/2012 | Masuda | |
| 2012/0062857 A1 | 3/2012 | Saitou et al. | |
| 2012/0147331 A1 | 6/2012 | Miyazaki | |
| 2012/0188516 A1 | 7/2012 | Kashiwagi et al. | |
| 2012/0201030 A1 | 8/2012 | Yuan et al. | |
| 2012/0320109 A1 | 12/2012 | Shibasaki | |
| 2013/0010264 A1 | 1/2013 | Takahashi et al. | |
| 2013/0021582 A1 | 1/2013 | Fujita et al. | |
| 2013/0021587 A1 | 1/2013 | Miyazaki et al. | |
| 2013/0070333 A1 | 3/2013 | Takahashi et al. | |
| 2013/0100423 A1 | 4/2013 | Yamagishi et al. | |
| 2015/0146100 A1 | 5/2015 | Saitou et al. | |

FOREIGN PATENT DOCUMENTS

| | | |
|---|---|---|
| EP | 2 290 443 A1 | 3/2011 |
| JP | 2004-341105 | 12/2004 |
| JP | 2006-23436 A | 1/2006 |
| JP | 2010-217566 | 9/2010 |
| JP | 2011-43719 | 3/2011 |
| JP | 2011-128521 | 6/2011 |
| JP | 2011-154168 | 8/2011 |
| JP | 2011-191602 | 9/2011 |
| JP | 2012-118220 | 6/2012 |
| JP | 2012-141581 | 7/2012 |
| JP | 2013-76968 | 4/2013 |
| JP | 2013-101317 | 5/2013 |
| WO | WO 02/41064 A1 | 5/2002 |
| WO | WO 2011/092841 A1 | 8/2011 |

OTHER PUBLICATIONS

Combined Office Action and Search Report issued on Nov. 10, 2015 in Chinese Patent Application No. 201380048612.1 with English translation.

International Search Report issued on Dec. 24, 2013 in PCT/JP2013/075385 filed on Sep. 12, 2013.

Office Action issued on Sep. 26, 2016 in Korean Patent Application No. 10-2015-7008097 with English translation.

* cited by examiner

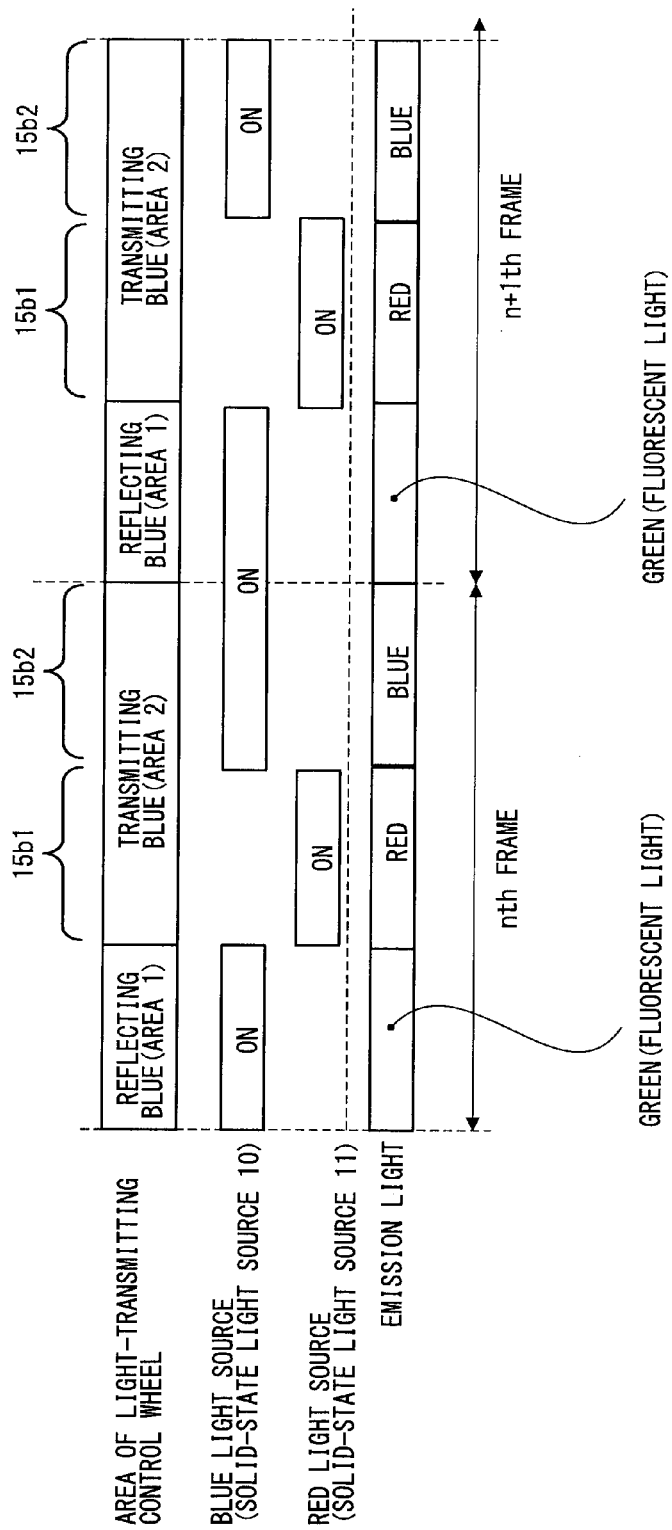

FIRST BOUNDARY PART CONDITION

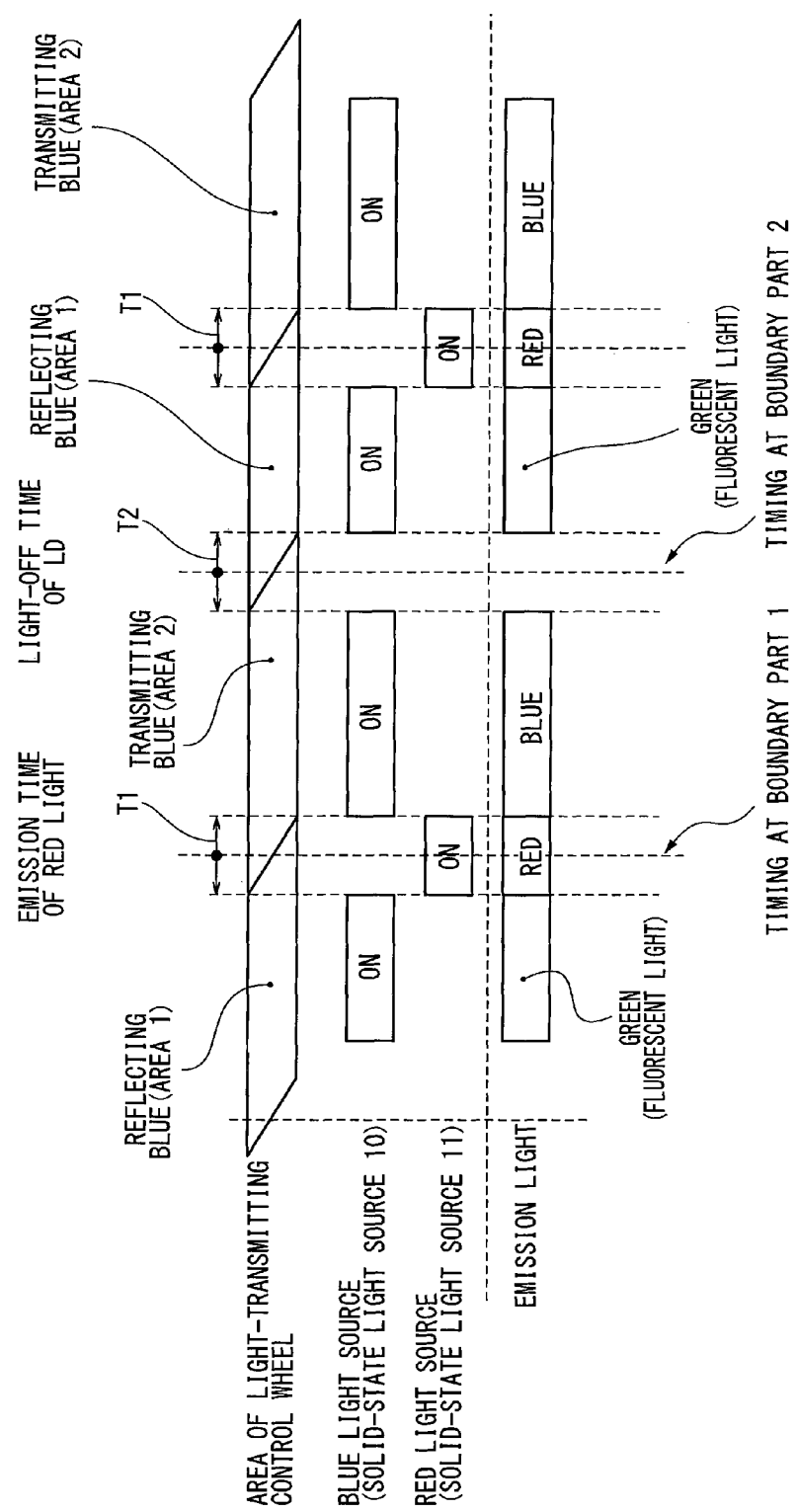

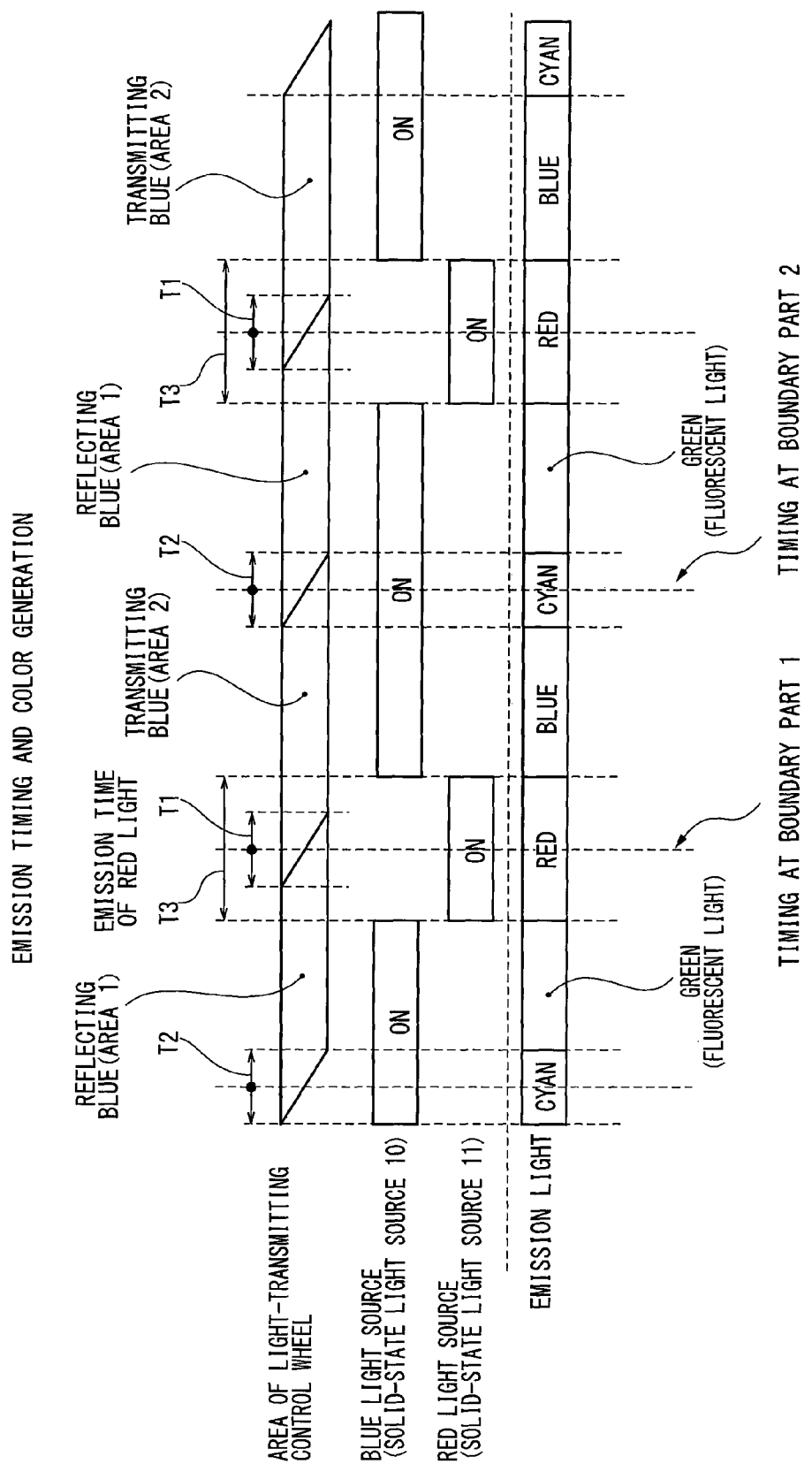

CONDITIONS OF AREAS 1 AND 2

CONDITIONS OF AREAS 3

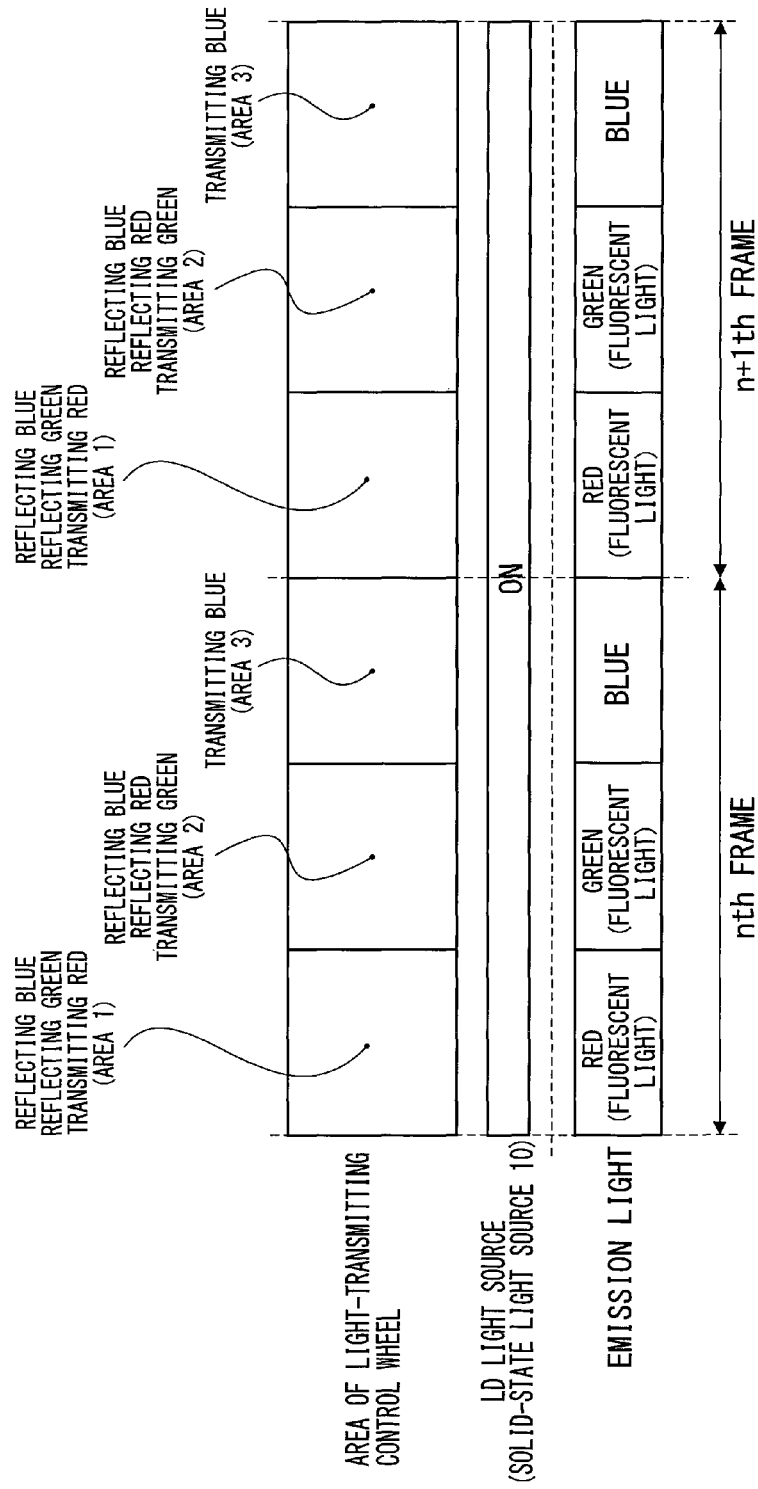

ILLUMINATION DEVICE INCLUDING A WAVELENGTH CONVERTER

TECHNICAL FIELD

The present invention relates to an illumination device having a wavelength converter which emits color light, a projector, and an illumination method.

BACKGROUND ART

Recently, display devices having a large-sized screen have become widespread, and are in common use at conferences, presentations, seminars and so on.

There are various displays such as a liquid crystal display or a plasma display. An appropriate one is selected from among the various displays in accordance with the available space or the number of participants when used. In particular, a projector, which is able to project an image to a projection surface such as a screen to be enlarged and displayed thereon, is the most widespread large-screen display because it is relatively reasonable cost-wise and superior in portability (that is, it is small and lightweight).

Recently, greater communication is needed in various situations. In this regard, there are many small meeting rooms or partitioned discussion spaces in an office, for example. Conferences or meetings using a projector are often held in such areas.

In addition, urgent or emergency meetings are often held in an open space such as a walkway while projecting and displaying information on the wall thereof when meeting rooms are occupied.

As the projector described above, a projector having a high luminance discharge lamp as a light source is known. The lamp is, for example, an extra-high-pressure mercury lamp. In recent years, a solid-state light-emitting device such as red, green and blue light-emitting diodes (LED) or an organic electro-luminescence has been developed and proposed as a light source.

For example, JP2010-217566A discloses a light source device including three light-emitting devices such as an R (Red) light-emitting device, G (Green) light-emitting device and B (Blue) light-emitting device. The R light-emitting device includes R (Red) phosphor and an R light source which excites the R phosphor. The G light-emitting device includes G (Green) phosphor and a G light source exciting the G phosphor. The B light-emitting device includes B (blue) phosphor and a B light source exciting the B phosphor.

A light source device which is capable of generating RGB light using only one light source is also considered (refer to, for example, JP 2004-341105A). The light source device disclosed in JP2004-341105A includes a solid-state light source emitting ultraviolet rays and a light source device having a light converter which converts the ultraviolet rays to visible light by phosphor. A projector using the light source device is also disclosed in JP2004-341105A. The light converter includes a phosphor wheel having a transparent disk (transparent base material) and three phosphor areas of RGB (area for red phosphor layer, area for green phosphor layer and area for blue phosphor layer) provided on the transparent disk to be divided into three in the circumferential direction thereof.

In the light source device, the phosphor wheel rotates by the motor. The ultraviolet rays are incident on the three phosphor areas of RGB in series according to the rotation of the transparent disk. Therefore, visible fluorescent light of RGB is generated in series from the three phosphor areas of RGB per predetermined period. In addition, the projector having the light source device forms images of RGB in series per predetermined period by a microdisplay. The projector, on the other hand, emits three kinds of visible light of RGB generated by the light source device. The three kinds of visible light of RGB generated in series are irradiated on the RGB images formed on the microdisplay in a predetermined period in order. Accordingly, the projector sequentially magnifies and projects each color image formed by the microdisplay.

Herein, only one type of the solid-state light source of ultraviolet rays is used in the light source device (illuminant system), but the phosphor area (phosphor layer) of the phosphor wheel is divided into three segments (area for red phosphor layer, area for green phosphor layer, area for blue phosphor area). Therefore, the construction of the phosphor wheel is complicated.

SUMMARY OF THE INVENTION

It is, therefore, an object of the present invention to provide an illumination device, a projector and an illumination method. The illumination device is capable of simplifying phosphor which emits light having a wavelength different from that of excitation light and generating plural light having different wavelengths from each other from one light source.

In order to accomplish the above object, an illumination device according to the present invention includes an excitation light source which emits excitation light, a wavelength converter which generates fluorescent light having a wavelength different from that of the excitation light through the excitation of the excitation light, and a light path-splitting member including a first filter and a second filter arranged to alternately come across a light path of the excitation light, wherein the first filter reflects one of the excitation light and the fluorescent light and transmits the other of the excitation light and the fluorescent light, the second filter transmits light reflected by the first filter and reflects light transmitted through the first filter, and the wavelength converter is disposed in a reflection light path or a transmission light path of the excitation light.

BRIEF DESCRIPTION OF THE DRAWINGS

FIG. 2A and FIG. 2B are explanatory views showing the illumination device shown in Embodiment 1. FIG. 2A is a plan view of a light-transmitting control wheel of the illumination device shown in FIG. 1, as viewed from the perpendicular direction to a surface of the wheel and the incident direction of excitation light. FIG. 2B is an explanatory view which illustrates a sequence of an example of a timing of light-emission of the illumination device shown in FIG. 1.

FIG. 3A is an optical view showing an emission light path of green light of the illumination device. FIG. 3B is an optical view showing an emission light path of blue light of the illumination device.

FIG. 5A to FIG. 5C are explanatory views showing an illumination device according to Embodiment 3 of the present invention. FIG. 5A and FIG. 5B are explanatory views of functions of a light-transmitting control wheel of the illumination device. FIG. 5C is an explanatory view which illustrates a sequence of an example of a timing of light-emission of the illumination device.

FIG. 6B is an explanatory view which illustrates a sequence of an example of a timing of light-emission of an illumination device according to Embodiment 4 of the present invention.

FIG. 11A is an optical view showing an emission light path of red or green light of the illumination device. FIG. 11B is an optical view showing an emission light path of blue light of the illumination device.

FIG. 12B is an explanatory view illustrating a timing of light-emission of the illumination device.

FIG. 13A is an optical view showing an emission light path of red or green light of the illumination device. FIG. 13B is a plan view of a light-transmitting control wheel of the illumination device, as viewed from the perpendicular direction to a surface of the wheel and the incident direction of excitation light.

FIG. 14A is a plan view of a light-transmitting control wheel of the illumination device, as viewed from the perpendicular direction to a surface of the wheel and the incident direction of excitation light. FIG. 14B is an explanatory view which illustrates a sequence of an example of light-emission of the illumination device.

DESCRIPTION OF EMBODIMENTS

Hereinafter, embodiments of an illumination device according to the present invention and a projector including the illumination device will be described with reference to the accompanying drawings.

Embodiment 1

Construction

Figure 1:
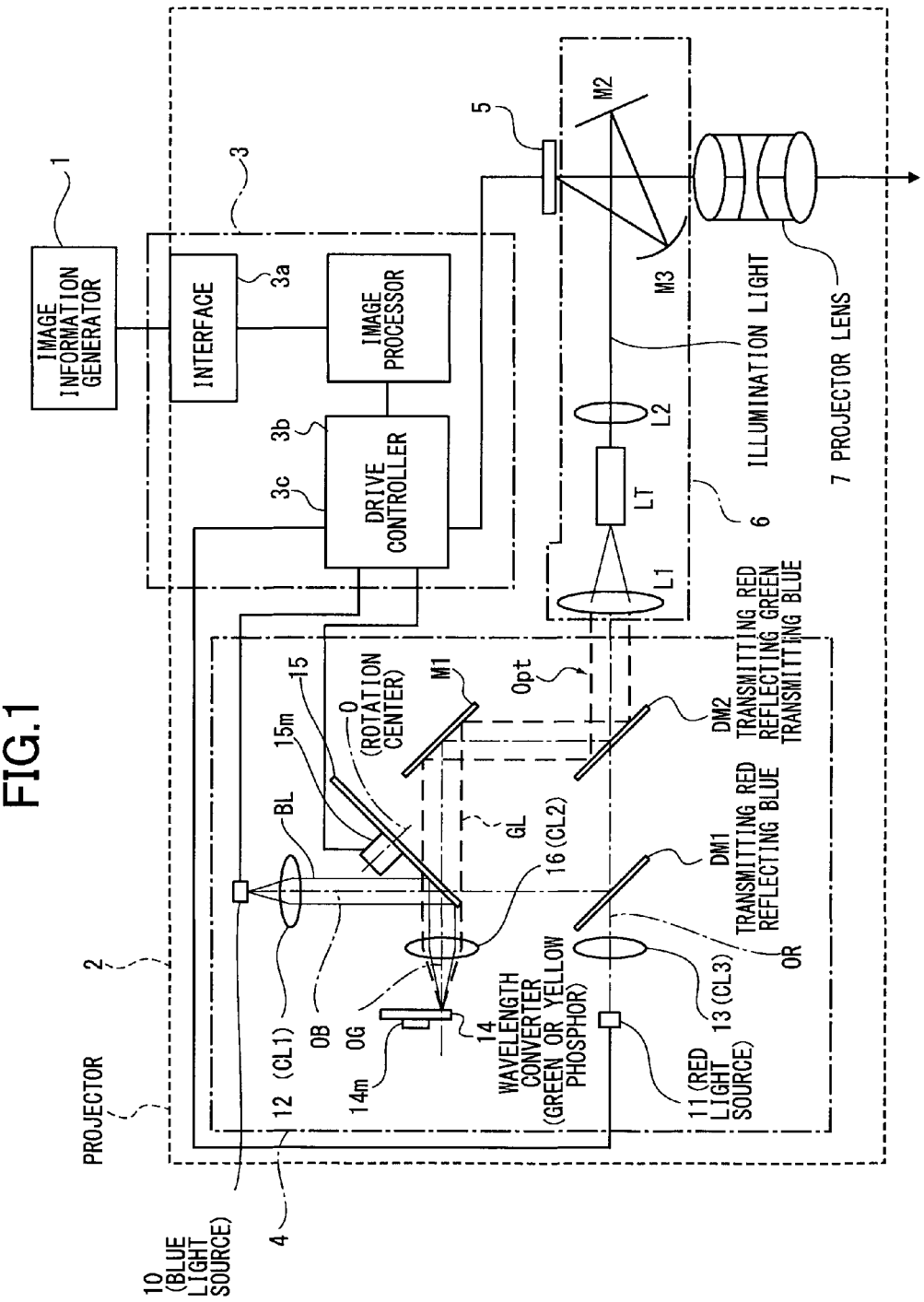
FIG. 1 is an optical view showing a projector having an illumination device according to Embodiment 1 of the present invention.
Figure 2A:
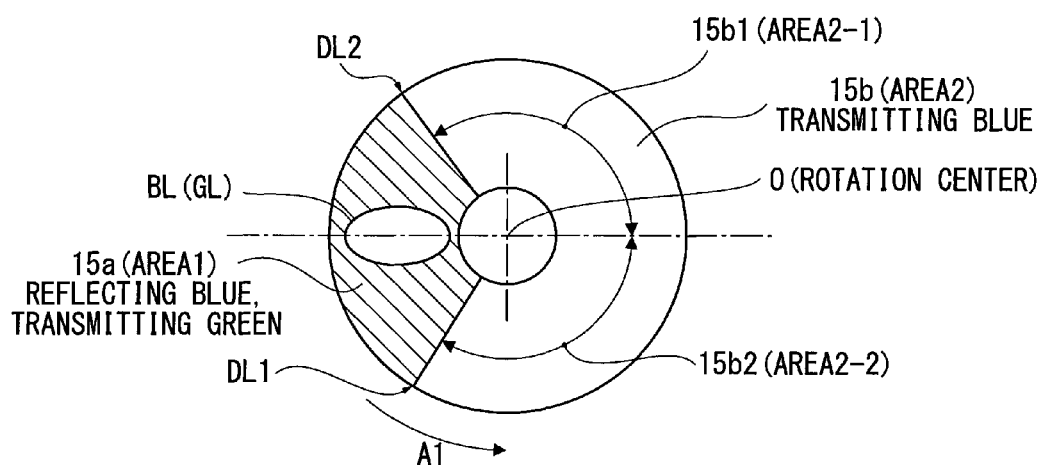

FIG. 1 is an optical view showing an optical system of a projector incorporating an illumination device according to Embodiment 1 of the present invention. FIG. 2A is a plan view of a light-transmitting control wheel, as viewed from the perpendicular direction to a surface of the light-transmitting control wheel.

[Schematic Construction of Projector]

In FIG. 1, numeral 1 shows an image information generator of an information processor such as a personal computer. Numeral 2 shows a projector projecting and displaying an enlarged image to a not-shown screen and the like according to image information (image data) generated by the image information generator 1.

The image information (image data) is generated for a motion picture, a still image, or the like, with color by the image information generator 1, so the image information contains G (green), R (red) and B (blue) image information.

The projector 2, as shown in FIG. 1, includes a control circuit (controller) 3 and an illumination device 4. The control circuit 3 controls each part of the projector corresponding to the image information input from the image information generator 1. The illumination device 4 is controlled by the control circuit 3 according to the image information, so that the illumination device 4 emits visible light of G (green), R (red) and B (blue).

In addition, as shown in FIG. 1, the projector 2 further includes: an image-forming element 5 forming a monochrome image corresponding to RGB of the image information in order, per a predetermined period; an illumination light-guide system (relay optical system) 6 guiding light from the illumination device 4 for use in RGB light to the image-forming element 5 in order; and a projection lens (projection optical system) 7, projecting each imaging light of RGB emitted from the image-forming element 5 in series, to an imaging display such as a screen (not shown).

In the embodiment, a DMD (Digital micromirror device) is provided in the image-forming element 5. A liquid crystal device can be also provided in the image-forming element 5.

[Control Circuit 3]

The control circuit 3, as shown in FIG. 1, includes an interface 3a, an image processor (image-processing circuit) 3b and a drive controller (drive control circuit) 3c. The input image information (image data) from the image information generator 1 is input to the interface 3a. The image processor 3b creates G (green) image information (G image data), R (red) image information (R image data) and B (blue) image information (B image data) for the colored image through the interface 3a per one frame. The drive controller 3c controls the driving of the illumination device 4 and the image-forming element 5 according to G image information (G image data), R image information (R image data), and B image information (B image data) created by the image-processor 3b.

The drive-controller 3c controls the driving of the image-forming element 5 according to G image information, R image information and B image information for the colored image input from the image information generator 1. Thereby, it forms a monochrome image corresponding to G image information, R image information and B image information in this order on the image-forming element 5 per predetermined period.

[Illumination Device 4]

The illumination device 4 being drive-controlled by the drive-controller 3c includes solid-state light sources (excitation light source) 10 and 11, as shown in FIGS. 1, 3A-3C (refer to the relationship between a light source and a solid-state light source which will be described later in the supplemental description). For the solid-state light sources 10 and 11, a laser diode (hereinafter, referred to as LD), an LED and so on may be used. In Embodiment 1, a blue-color light source (blue light source) is used as the solid-state light source 10. Specifically, the LD or LED which emits excitation light having the wavelength of blue color (blue light) is used. As the solid-state light source 11, a red-color light source (red light source), specifically, the LD or LED which emits light having the wavelength of red color (red light) is used. Herein, an optical axis of the blue light emitted from the solid-state light source 10 is indicated as OB, and an optical axis of the red light emitted from the solid-state light source 11 is indicated as OR. The solid-state light sources 10 and 11 are disposed such that the optical axis OB and the optical axis OR are at right angles in the intersection.

A blue LD emitting light having the wavelength of blue color is appropriate for the solid-state light source 10. A red LD emitting light having the wavelength of red color is appropriate for the solid-state light source 11. Accordingly, the description hereafter will be given assuming that an LD light source emitting blue light is used for the solid-state light source 10 and an LD light source emitting red light is used for the solid-state light source 11.

Additionally, it is appropriate for the wavelength bandwidth of the blue light emitted from the solid-state light source to be from 400 nm to 460 nm or the wavelength including this range. It is appropriate for the wavelength bandwidth of the red light emitted from the solid-state light source 11 to be from 620 nm to 750 nm or the wavelength including this range. However, it is not limited to those in the embodiments of the present invention.

The illumination device 4, as shown in FIG. 1, 3A-3C, further includes a dichroic mirror DM1 and a dichroic mirror DM2. The dichroic mirror DM1 transmits light having the wavelength of red color and reflects light having the wavelength of blue color. The dichroic mirror DM2 transmits light having the wavelength of red and blue colors and reflects light having the wavelength of green color.

Figure 3A:
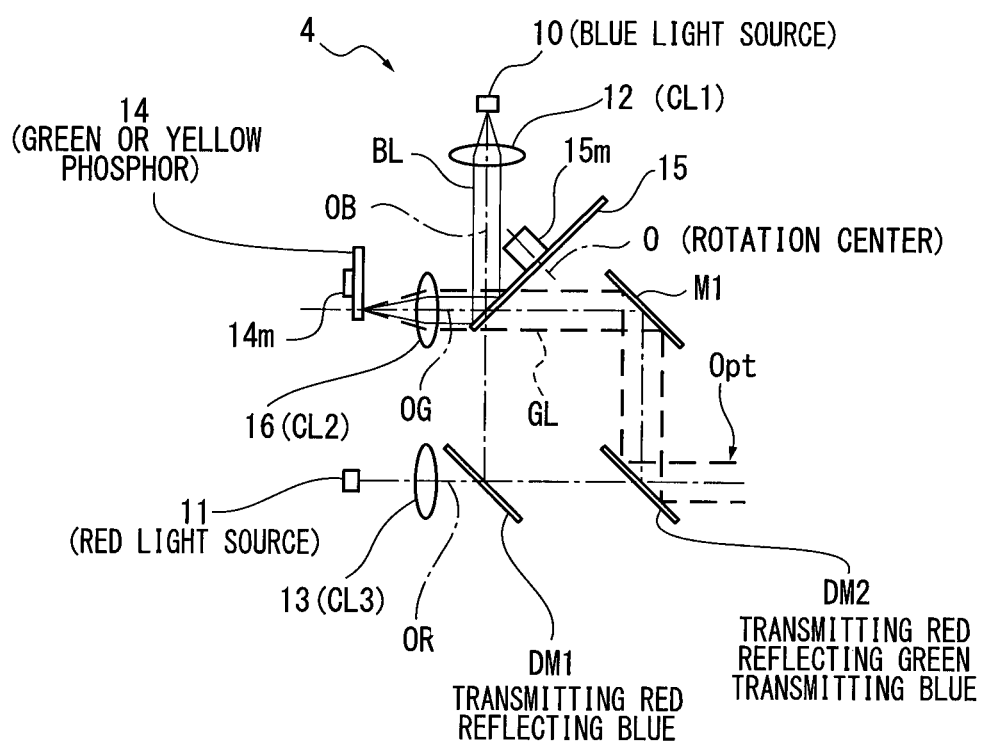
FIG. 3A and FIG. 3B are explanatory views showing a function of the illumination device shown in FIG. 1.
Figure 3B:
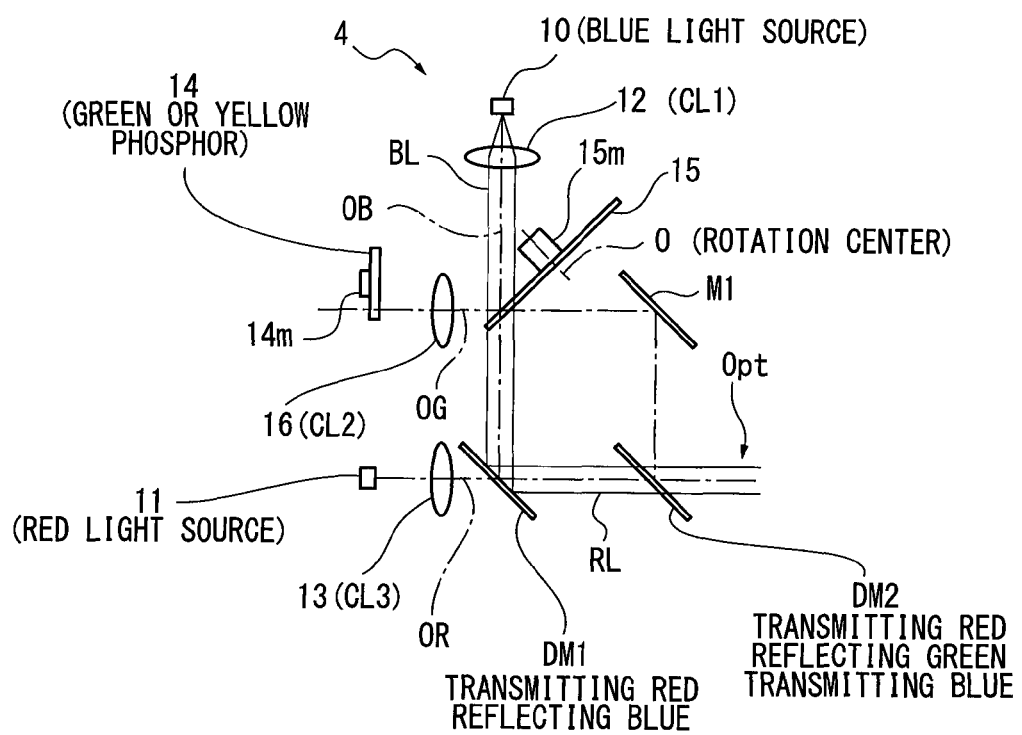
Figure 3C:
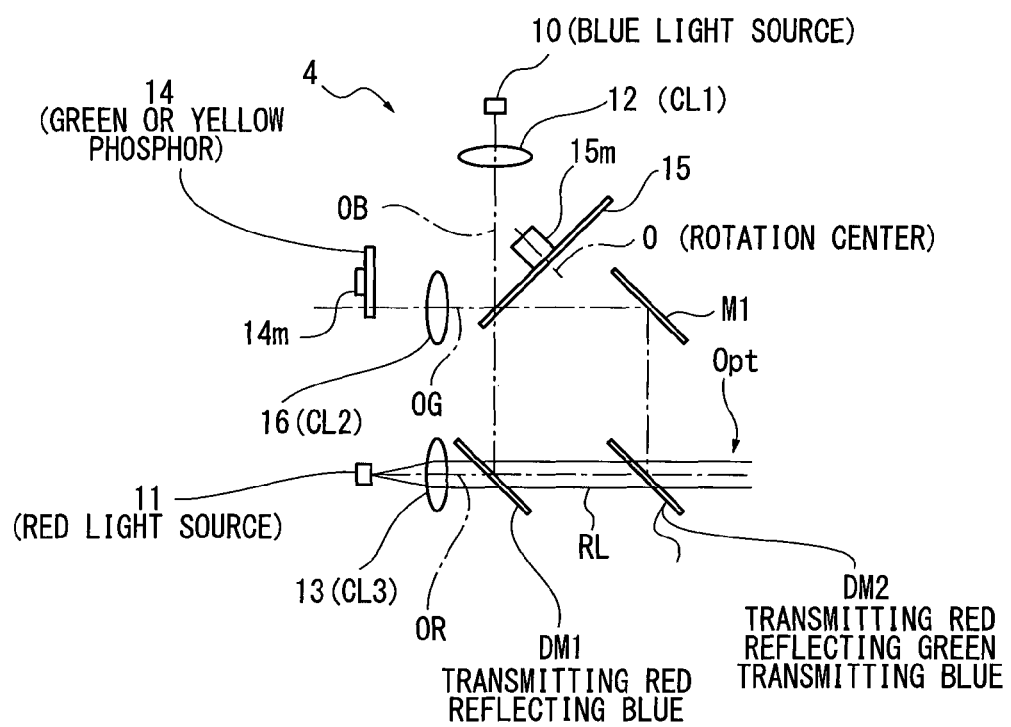
FIG. 3C is an optical view showing an emission light path of red light of the illumination device.

The dichroic mirror DM1 is disposed in the intersection of the optical axes OB and OR being inclined at 45 degrees to the optical axes OB and OR. Thereby, as shown in FIG. 3B, the dichroic mirror DM1 reflects the blue light BL emitted from the solid-state light source 10 towards the perpendicular direction (right angle) to the optical axis OB. As shown in FIG. 3C, the dichroic mirror DM1 transmits the red light RL emitted from the solid-state light source 11 towards the reflecting direction of the blue light BL.

The dichroic mirror DM2 is disposed in a light path of the blue light BL reflected by the dichroic mirror DM1 and a light path of the red light RL being transmitted through the dichroic mirror DM1. The blue light BL and the red light RL being transmitted through the dichroic mirror DM2 are incident on the illumination light guide system 6. A light path between the dichroic mirror DM2 and the illumination light guide system 6 is an emission light path Opt in the illumination device 4. In other words, the dichroic mirror DM1 and the dichroic mirror DM2 are light path-combining elements which combine the excitation light of the blue light BL, the green fluorescent light GL described later and the red light RL into the emission light path Opt.

Furthermore, the illumination device 4 includes a coupling lens 12 (CL1) and a coupling lens 13 (CL3) as light-condensing elements. The blue light emitted from the solid-state light source 10 becomes a parallel light flux of blue-color light BL through the coupling lens 12. The red light emitted from the solid-state light source 11, as shown in FIG. 3C, becomes a parallel light flux of the red-color light RL through the coupling lens 13.

The LD used for the solid-state light source 10 includes a light-emitting part emitting blue light BL which disperses at a certain angle, so the blue light emitted from the light-emitting part of the solid-state light source 10 becomes parallel light through the coupling lens 12 (CL1).

Similarly, the LD used for the solid-state light source 11 includes a light-emitting part emitting red light RL which disperses at a certain angle, so the red light RL emitted from the light-emitting part of the solid-state light source 11 becomes parallel light through the coupling lens 13 (CL3).

The illumination device 4 includes a wavelength converter (phosphor) 14 which emits fluorescent light excited by the blue-color light BL. The wavelength converter 14 includes phosphor which generates fluorescent light excited by the blue-color light BL. The fluorescent light has a wavelength bandwidth including a wavelength capable of generating green fluorescent light at least. In particular, green or yellow phosphor or phosphor having blue color and red color is used preferably. For green color, as an example, phosphor having YAG series green or yellow-green, or sialon series green is appropriate. When generating green-color emission light, phosphor which generates green fluorescent light at least is preferably used. For instance, phosphor generating green or yellow fluorescent light or phosphor having at least green and red color can be used. In this manner, by generating fluorescent light having a wavelength bandwidth different from the wavelength of green color, flexibility in color tone of green is increased when choosing the green-color light.

It is appropriate for the wavelength bandwidth of the green fluorescent light to be specifically between 500 nm to 600 nm or the wavelength including the above range. It is appropriate for the wavelength bandwidth for the yellow fluorescent light to be between 500 nm to 750 nm or the wavelength including the above range.

Hereinafter, an embodiment in which the green or yellow phosphor is used as the wavelength converter 14 is described.

The wavelength converter 14 has a disc-like shape. It is rotatable driven by a driving motor 14m. The drive controller 3c controls the rotation-drive of the driving motor 14m. In this regard, the wavelength converter 14 may be controlled so as to rotate at a constant velocity. In fact, it is required that the incident position of blue excitation light can be changed by rotating the wavelength converter 14 so that the phosphor used in the wavelength converter 14 can be cooled while not being deteriorated.

Additionally, the illumination device 4 further includes a light-transmitting control wheel (light path splitter) 15 and a coupling lens 16 (CL2) as a light-condensing element. The light-transmitting control wheel 15 is disposed in the light path of the excitation light BL between the solid-state light source 10 and the dichroic mirror DM1. The coupling lens 16 (CL2) is disposed between the wavelength converter 14 and the light-transmitting control wheel 15.

The blue light (excitation light) BL is reflected towards the wavelength converter 14 by a first dichroic filter (area 1) 15a in the light-transmitting control wheel 15 in FIG. 2A and then concentrated by the coupling lens 16 (CL2). After being concentrated, the blue light BL is incident on the wavelength converter 14 as excitation light for exciting green or yellow fluorescent light. The coupling lens 16 (CL2) further concentrates the green or yellow fluorescent light being excited by the blue light BL and dispersing from the wavelength converter 14. Herein, the green or yellow fluorescent light becomes a parallel flux of fluorescent light and is directed to the light-transmitting control wheel 15 to enter the wheel 15. The first dichroic filter (area 1) 15a in the light-transmitting control wheel 15 in FIG. 2A selects and transmits green fluorescent light in the green or yellow fluorescent light. A description of the first dichroic filter 15a will be given later. As described above, because green fluorescent light having a certain wavelength is selected from green or yellow fluorescent light generated from phosphor of the light-transmitting control wheel 15 for transmission, it is made possible to control color-tone of green at will.

Herein, the green light GL is green fluorescent light being transmitted through the light-transmitting control wheel 15. OG is the optical axis of the green light GL. The illumination device 4 includes a mirror M1 which reflects the green light GL perpendicularly (right angle) towards the dichroic mirror DM2 as shown in FIGS. 1, 3A. The mirror M1 and the dichroic mirror DM2 are provided as a light path-combining element which combines green light GL with the emission light path Opt.

The light-transmitting-control wheel 15 as the light path-splitting member rotates around a rotation center O by a driving motor 15m. The driving motor 15m is controlled by the drive controller 3c.

The light-transmitting control wheel 15 has a round shape as shown in FIG. 2A when seen from the incident direction of the blue light BL in FIG. 1 and the perpendicular direction to its surface. The light-transmitting control wheel 15 includes two dichroic filters in a circumferential direction thereof as shown in FIG. 2A. That is, the wheel has a first dichroic filter (area 1) 15a as a first filter which reflects blue light and transmits green light after selecting the green light and a second dichroic filter (area 2) 15b as the second filter which transmits blue light only. The second dichroic filter (area 2) 15b is divided equally into two in a circumferential direction and thereby it has an area 15b1 (area 2-1) and an area 15b2 (area 2-2).

The first dichroic filter (area 1) 15a is shaped to be more than 120 degrees within the 360 degrees of the light-transmitting control wheel 15. In FIG. 2A, the angle of the first dichroic filter 15a is a little bigger than 120 degrees. The first dichroic filter 15a reflects blue light and transmits green light after selecting the green light. The second dichroic filter (area 2) 15b is provided in an area except the area provided with the first dichroic filter 15a. In FIG. 2A, the angle of the second dichroic filter 15b is a little smaller than 240 degrees. The second dichroic filter 15b transmits blue light.

The light-transmitting control wheel 15 is provided to be inclined at 45 degrees to the optical axis OB in the light path of excitation light (blue light BL) emitted from the solid-state light source 10. In the light-transmitting control wheel 15, the first dichroic filter (area 1) 15a and the second dichroic filter (area 2) 15b are configured to appear one after the other in the light path of the blue light BL by the rotary drive of the driving motor 15m. When the first dichroic filter 15a moves (locates) in the light path of the blue light BL according to the rotation of the light-transmitting control wheel 15, the blue light BL from the solid-state light source is reflected at a right angle toward the wavelength converter 14 (green or yellow phosphor) by the dichroic filter (area 1) 15a, as shown in FIGS. 1 and 3A. On the other hand, when the second dichroic filter (area 2) 15b moves (locates) in the light path of the blue light BL, the blue light BL is transmitted through the second dichroic filter 15b as shown in FIG. 3B.

As described above, in the present and later embodiments of the present invention, the first dichroic filter (area 1) 15a and the second dichroic filter (area 2) 15b are configured to be located one after the other in the light path of the blue light BL by the rotation of the light-transmitting control wheel 15 having a round shape. However it is not always limited to the above. A configuration may be applied in which the first dichroic filter (area 1) 15a and the second dichroic filter (area 2) 15b are alternately provided in the light path by reciprocating the light-transmitting control wheel 15 in the light path. Similarly, the first dichroic filter (area 1) 15a and the second dichroic filter (area 2) 15b, which are separated from each other, can be alternately provided in the light path. Furthermore, the light path-splitting member is not limited to have the round shape. It may be formed in another shape.

The blue light BL which is reflected by the first dichroic filter (area 1) 15a is concentrated through the coupling lens 16 as shown in FIGS. 1 and 3A. The wavelength converter (green or yellow phosphor) 14 is disposed in the position where the blue light BL is concentrated and its diameter of irradiation-spot becomes smaller. The blue light BL is concentrated to the wavelength converter 14 through the coupling lens 16. Thereby, the wavelength converter 14 is excited by the concentrated light and generates green or yellow fluorescent light.

The green or yellow fluorescent light passes the light path of the blue light BL (excitation light) in reverse and is incident on the coupling lens (condensing lens) 16. The green or yellow fluorescent light becomes a parallel light flux through the coupling lens 16. The fluorescent light is incident on the first dichroic filter (area 1) 15a. The first dichroic filter (area 1) 15a selects green fluorescent light (green light GL) from the green and yellow fluorescent light and transmits it.

The green light GL transmitted through the first dichroic filter (area 1) 15a is reflected by the mirror M1 and enters the dichroic mirror DM2. The green light is reflected by the dichroic mirror DM2, joins the emission light path Opt, and is emitted towards the illumination light guide system 6.

[Illumination Light Guide System 6]

The illumination light guide system 6 includes, as shown in FIG. 1: a condensing lens (condensing element) L1 on which light (blue light BL, green light GL and red light RL) from the dichroic mirror DM2 is incident; a light tunnel LT on which light (blue light BL, green light GL and red light RL) concentrated by the condensing lens L1 is incident; a relay lens (condensing element) L2 which relays light emitted from the light tunnel LT; a mirror M2 on which light (blue light BL, green light GL and red light RL) from the relay lens L2 is incident; and a concave mirror (mirror) M3 which reflects light (blue light BL, green light GL and red light RL) reflected by the mirror M2 toward the image-forming element 5.

[Function]

Hereinafter, the function of the projector 2 configured as described above will be explained with reference to other configurations as well as with drawings.

Color image information is output from the image information generator 1 of the information processor such as a not-shown personal computer and is input to the image processor 3b of the projector 2 through the interface 3a in FIG. 1. Then, the image processor 3b creates G (green) image information (G image data), R (red) image information (R image data) and B (blue) image information (B image data) in this order per frame. The image processor 3b inputs the G image data, the R image data and the B image data of the created image information (color image) into the drive controller 3c in series per frame.

The drive controller 3c controls the driving of the image-forming element 5 in accordance with the input G image information, R image information and B image information of the color image, so that a monochrome image corresponding to the G image information, R image information and B image information is formed in the image-forming element 5 in this order per predetermined period.

Herein, the drive controller 3c controls the solid-state light source 11 having a red LD to be turned on (ON) during a period in which a monochrome image corresponding to R image information is formed in the image-forming element 5. On the other hand, the drive controller 3c controls the solid-state light source 11 to be turned off (OFF) during a period in which a monochrome image corresponding to G image information and R image information is continuously formed in this order in the image-forming element 5.

The drive controller 3c controls the solid-state light source 10 having a blue LD to be turned on during a period in which a monochrome image corresponding to G image information and B image information is continuously formed in this order in the image-forming element 5. The drive controller 3c controls the solid-state light source 10 to be turned off during the period in which a monochrome image corresponding to R image information is formed in the image information-formation element 5.

When the solid-state light source 11 is turned on, the red light RL is dispersed and emitted from the solid-state light source 11 so that the light is incident on the coupling lens 13 (CL3). The dispersing red light RL is incident on the dichroic mirror DM1 after being changed to a parallel light flux through the coupling lens 13 (CL3).

When the solid-state light source 10 is turned on, the blue light BL for excitation is dispersed and emitted from the solid-state light source 10 so that the light is incident on the coupling lens 12 (CL1). The dispersed blue light BL is incident on the light-transmitting control wheel 15 after being changed to a parallel light flux through the coupling lens 12 (CL1).

The drive controller 3c controls the driving motor (pulse motor) 15m of the light-transmitting control wheel 15 with the control of the image-forming element 5 and the solid-state light sources 10 and 11 as described above. As a result of such control, the control of color generation is accomplished in a sequence shown in FIG. 2B when the light-transmitting control wheel 15 rotates one revolution around the rotation center O in the arrow A1 direction in FIG. 2A per frame.

Namely, as described above, when the second dichroic filter (area 2) 15b of the light-transmitting control wheel 15 is divided equally into two in a circumferential direction, the filter has the area 15b1 (area 2-1) and the area 15b2 (area 2-2). Herein, each of the first dichroic filter (area 1) 15a, area 2-1 and 2-2 of the second dichroic filter (area 2) 15b locates in the light path of the blue light BL from the solid-state light source 10 in this order, in accordance with the rotation of the light-transmitting control wheel 15 in the arrow A1 (refer to FIG. 2A) direction.

While the area 2-2 of the second dichroic filter (area 2) 15b and the first dichroic filter (area 1) are located in the light path of the blue light BL, as shown in FIG. 2B, the drive controller 3c turns on the solid-state light source 10 so that the blue light BL is emitted, and turns off the solid-state light source 11.

[Generation of Green Light]

The blue light BL is reflected by the first dichroic filter (area 1) 15a to the wavelength converter 14 when the first dichroic filter 15a is located in the light path. The light is concentrated by the coupling lens 16 (CL2) and incident on the wavelength converter 14 so that green or yellow phosphor (phosphor member) of the converter 14 is excited by the light. From the excitation, green or yellow fluorescent light is emitted from phosphor (phosphor member) of the wavelength converter 14.

The green or yellow fluorescent light is incident on the first dichroic filter (area 1) 15a after being changed to a parallel light flux through the coupling lens 16 (CL2). The first dichroic filter selects green fluorescent light (green light) from green and yellow fluorescent light and transmits the same. Thereafter, the green light GL is reflected by the mirror M1, incident on the dichroic mirror DM2 and further reflected by the dichroic mirror DM2, then the light joins the emission light path Opt (refer to FIG. 3A). Afterwards, the green light GL is incident on the condensing lens (condensing element) L1 of the illumination light guide system 6 as shown in FIG. 1.

On the other hand, the drive controller 3c controls the driving motor 14m and rotates the wavelength converter 14 at a certain velocity during the above operation. Thereby, it becomes possible to change the incident position of the blue light BL and cool down the phosphor in the wavelength converter 14 while not being deteriorated.

[Generation of Red Light]

While the area 2-1 of the second dichroic filter (area 2) 15b is located in the light path of the blue light BL, as shown in FIG. 2B, the drive controller 3c turns off the solid-state light source 10 and turns on the solid-state light source 11. When the solid-state light source 11 is turned on, red light is dispersed and emitted from the light source 11 and incident on the coupling lens 13 (CL3). The dispersed red light is emitted to the dichroic mirror DM1 after being changed to a parallel light flux by the coupling lens 13 (CL3). The red light RL is transmitted through the dichroic mirrors DM1 and DM2 and joins the emission light path Opt (refer to FIG. 3C). Thereafter, the red light RL is incident on the condensing lens (condensing element) L1 of the illumination light guide system 6 as shown in FIG. 1.

[Generation of Blue Light]

While the area 2-2 of the second dichroic filter (area 2) 15b is located in the light path of the blue light BL, the blue light BL is transmitted through the area 2-2, and is reflected by the dichroic mirror DM1 towards the dichroic mirror DM2. The blue light BL is transmitted through the dichroic mirror DM2 and joins the emission light path Opt (refer to FIG. 3B). Thereafter, the blue light BL is incident on the condensing lens (condensing element) L1 of the illumination light guide system 6 as shown in FIG. 1.

Herein, when considering the nth frame of image information as shown in FIG. 2B, the above-described blue solid-state light source 10 is turned on while the first dichroic filter (area 1) 15a and the latter half area 2-2 of the second dichroic filter (area 2) 15b are located in the excitation light path. The solid-state light source 10 is turned off while the first half area 2-1 of the second dichroic filter (area 2) 15b is located in the excitation light path. Furthermore, the red solid-state light source 11 is turned on while the area 2-1 is located in the excitation light path and the blue solid-state light source is turned off. Thus, the green light (green fluorescent light) GL, the red light RL and the blue light BL are generated in this order in the nth frame per predetermined period. The green light GL, the red light RL and the blue light BL are generated in n+1th frame similar to the nth frame.

The green light (green fluorescent light) GL, red light RL, and blue light BL are guided to the image-forming element 5 through the illumination light guide system 6 in this order. Synchronized with the generation of such light, monochrome images according to G (green, fluorescent light) image information, R (red) image information and B (blue) image information are generated in this order.

While the monochrome image according to G image information is formed in the image-forming element 5, the monochrome image of the image-forming element 5 is irradiated by the green light GL. Thereby, a light flux of a green (fluorescent light) image is emitted from the element 5. The green (fluorescent light) image is projected to the display such as a not-shown screen through a projection lens 7. Similarly, while the monochrome image according to red image information is formed in the image-forming element 5, the monochrome image is irradiated by the red light RL so that a light flux of a red image is emitted from the image-forming element 5. The red image is projected to the display such as a not-shown screen through the projection lens 7. While the monochrome image according to blue image information is formed in the image-forming element 5, the monochrome image is irradiated by the blue light BL so that a light flux of a blue image is emitted from the image-forming element 5. The blue image is projected to the display such as a not-shown screen through the projection lens 7.

Thus, the green, red and blue images of one frame are projected in series to the display such as a not-shown screen while the light-transmitting control wheel 15 rotates one revolution. Therefore, a color image of one frame appears in the image display.

As described above, the solid-state light source 10 can be used as both of an excitation light source for generating fluorescent light and a light source for blue color. Accordingly, it is made possible to reduce the number of the light sources, miniaturize the device and reduce the cost of the device according to the reduction of the costs of the light source.

Modified Example of Embodiment 1

In above-described embodiment, the drive controller 3c controls the driving motor 14m so as to rotate the wavelength converter 14 at a constant velocity, such that the incident position of excitation light (blue light) is changed, and the phosphor for use in the wavelength convertor 14 is cooled while not being deteriorated. However, it is not always limited to the above construction.

For example, the rotation of the wavelength converter 14 can be intermittently controlled. In this regard, the incident position of excitation light can be changed by rotating the wavelength converter 14 so that phosphor used in the wavelength converter 14 can be cooled while not being deteriorated.

On the other hand, the rotation of the wavelength converter 14 can be controlled under a predetermined condition per certain angle. Namely, when the phosphor used in the wavelength converter 14 is deteriorated on some level, the wavelength converter 14 is rotated at a certain angle, so that the incident position of excitation light can be changed and the condition of fluorescent light emitted from the phosphor is made to be the same as the initial condition. Such rotation control can be performed per predetermined period or can be performed when the emission amount of fluorescent light is lowered by a certain amount.

Furthermore, the wavelength converter 14 is configured to rotate by the driving motor 14m in order to extend its operating life, but it is not necessary to be configured to rotate by the driving motor. It may be configured in a fixed mount type.

Supplementary Description of Embodiment 1

In FIG. 1, as described above, the embodiment of the projector incorporating the illumination device according to Embodiment 1 is illustrated. In the illumination device (illumination light source device) described in Embodiment 1, time-split single color light (emission light) is guided to the image-forming element 5.

The image-forming element 5 is generally irradiated by the light (emission light) through several light-homogenizing elements called an integrator and several light-concentrating elements (in Embodiment 1, condensing lens L1, relay lens L2). The integrator includes an optical member called a light tunnel (in Embodiment 1, LT) which has a rectangular tunnel formed by four mirrors. A desired illumination light system is provided so that the image on the exit of the light tunnel can be formed on the image formation panel (panel surface) of the image-forming element 5 conjugatively. In this regard, as the optical members used in the illumination light system, the relay lens L2 and the mirrors M2 and M3 are provided. The image-forming surface (panel surface) of the image-forming element 5 is effectively irradiated so that the light can be distributed evenly in the image formation panel (panel surface) of the image-forming element 5 through the illumination light system.

Accordingly, the image-forming element 5 (panel) is illuminated by the light (emission light). The image information displayed in the image formation surface (panel surface) is projected and displayed to the display panel (screen, etc.) while being enlarged. The display panel is located at a conjugate position to the image formation panel (panel surface).

For the image-forming element 5 (panel), DMD (digital micromirror array device) produced by Texas Instruments Incorporated is preferably used. The DMD includes two-dimensionally-arranged many micromirrors of pixels. It controls the light-reflection direction by changing an inclination angle of a micromirror of a pixel corresponding to the image information.

In the DMD, a micromirror of a pixel for white display is inclined at an angle which guides light to the projection lens 7, and a micromirror of a pixel for black display is inclined at an angle which does not guide light to the projection lens 7, so as to change the polarization direction of light per pixel for displaying an image.

The above art is well known, so the detailed description of DMD is omitted.

A single light-forming element 5 is provided. It changes the red image, green image and blue image in series at high speed in accordance with the color of light (emission light) obtained from the above-described illumination device. The full-color image is displayed by using an afterimage phenomenon of the eyes.

For projection, image information from the image information generator such as a PC is typical. Image information is input to the image processor 3b through the interface 3a. The light emission of the light sources (solid-state light sources 10 and 11), the rotation of the light-transmitting control wheel 15 and the image-forming element 5 are controlled. Such controls are performed by the drive controller 3c so that the image projection can be performed according to the image which is input to the image processor 3b through the interface 3a.

Embodiment 2

Figure 4A:
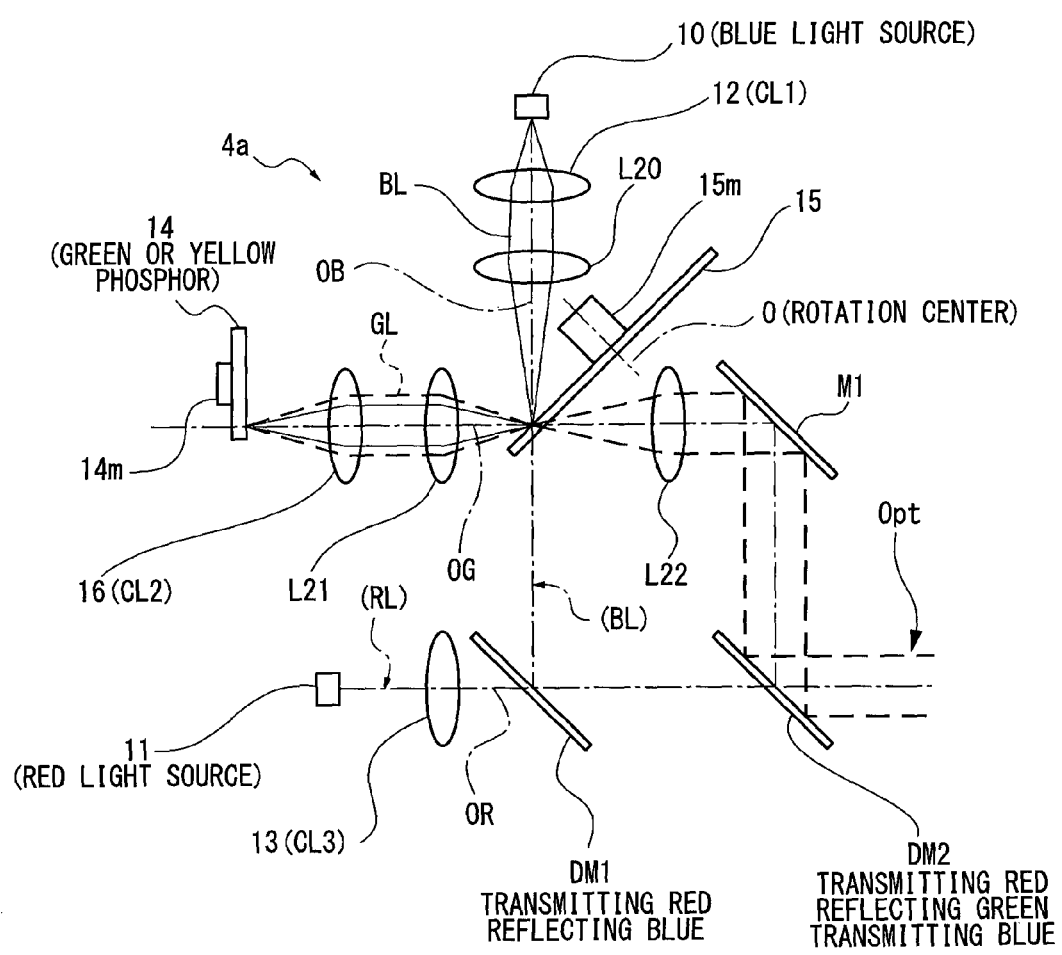
FIG. 4A is an optical view showing the illumination device according to Embodiment 2 of the present invention.
Figure 4B:
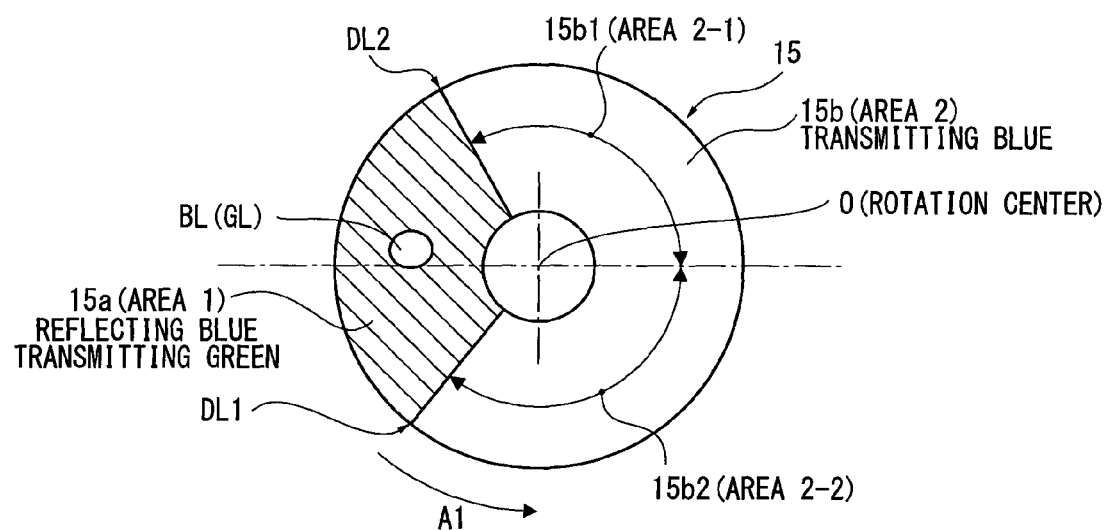
FIG. 4B is a plan view of a light-transmitting control wheel of the illumination device shown in FIG. 4A, as viewed from the perpendicular direction to a surface of the wheel and the incident direction of excitation light.

FIGS. 4A and 4B

The above-described light-transmitting control wheel 15 in Embodiment 1 includes boundary region lines between the first dichroic filter (area 1) 15a and the second dichroic filter (area 2) 15b as shown in FIG. 2A. The boundary region lines are indicated as a first and second boundary parts DL1 and DL2.

The blue light BL emitted from the solid-state light source 10 has a certain width (refer to FIG. 2A). Thereby, there is a predetermined period while the blue light BL having such a width (hereinafter, referred to as light flux range) crosses the boundary part.

When the blue light BL in FIG. 1 enters the first and second boundary parts DL1 or DL2 of the light-transmitting control wheel 15, the blue light is incident on both in the first dichroic filter (area 1) 15a and the second dichroic filter (area 2) 15b in FIG. 2A, and the blue light BL emitted from the solid-state light source 10 in FIG. 1 is transmitted through the light-transmitting control wheel 15, or is reflected by the wheel.

The blue light BL herein consists of the blue light BL which is reflected by the first dichroic filter 15a and becomes excitation light for phosphor in the wavelength converter 14; and the blue light BL transmitting through the second dichroic filter 15b. There is a period in which the blue light BL and the fluorescent light GL are mixed in the emission light path Opt (color mixing time).

The above time is defined as a spoke time. The longer the spoke time is, in other words, the longer the color mixing time is, the more the purity of color of the illumination device is decreased.

The spoke time becomes longer when the light-flux range of light from light source is broad, and it becomes shorter when the range is small. Ideally, if light from the light source is concentrated at one point on the light-transmitting control wheel 15, the spoke time can be disregarded and the mixture of colors may be controlled. However, because of the variations in the size of the light source, the distortion of a light-condensing system and the variations in the setup, the actual light-flux range has a certain size.

In line with the above, to minimize the spoke time, an illumination device 4a according to Embodiment 2 is configured to have the minimum (smallest) light-flux range as shown in FIG. 4A. A description of this follows. To reduce the light flux range as much as possible, in Embodiment 2, light is concentrated once on the light-transmitting control wheel 15.

In Embodiment 1, as shown in FIG. 1, the blue light BL emitted from the solid-state light source 10 becomes an approximately parallel light flux through the coupling lens 12 (CL1).

In contrast, in Embodiment 2, as shown in FIG. 4A, the light-condensing system is provided. The system includes: a coupling lens 12 (CL1) which changes the blue light BL emitted from the solid-state light source 10 to an approximately parallel light flux; a light-condensing lens L20 which concentrates the blue light BL on the light-transmitting control wheel 15.

As shown in FIG. 4A, the blue light BL is reflected by the light-transmitting control wheel 15 and disperses towards the wavelength converter 14. The dispersing blue light BL becomes a parallel light flux through the light-condensing lens L21. The light flux is concentrated through the coupling lens 16 (CL2) and incident on the wavelength converter 14.

According to Embodiment 2, the spoke time can be shortened by condensing the excitation light (blue light BL) emitted from the solid-state light source 10 through the light-condensing lens L20 compared with the condition in which excitation light is not concentrated on the wheel. Similarly, by condensing green and yellow fluorescent light from the wavelength converter 14 on the light-transmitting control wheel 15 through the light-condensing lens L21, the spoke time can be shortened, compared with the condition in which the fluorescent light is not concentrated.

In Embodiment 2, as shown in FIG. 4A, a light-condensing lens (light-condensing element) L22 is provided between the light-transmitting control wheel 15 and a mirror M1. The green light GL is transmitted through the light-transmitting control wheel 15 and disperses. The green light becomes a parallel light flux through the light-condensing lens L22 and enters the mirror M1. In Embodiment 2, similar controls as Embodiment 1 are performed such that the green light GL entering the mirror M1 is reflected by the dichroic mirror DM2 and so on, so the detailed description thereof are omitted.

Modified Example of Embodiment 2

In Embodiment 2, the light-condensing lens L20 which concentrates the blue light BL emitted from the solid-state light source 10 to the light-transmitting control wheel 15 is added. However, the light-condensing lens L20 need not necessarily always be included. It can be configured to concentrate the blue light BL on the light-transmitting control wheel by only the coupling lens 12 (CL1).

The spoke time of the blue light BL which enters the light-transmitting control wheel 15 from the light source 10 is described above. Similarly, it can be applied to fluorescent light generated from the wavelength converter 14 of phosphor.

In this regard, the light-condensing lens L21 is disposed between the coupling lens 16 and the light-transmitting control wheel 15 so that the blue light BL which is reflected by the light-transmitting control wheel 15 towards the wavelength converter 14 of phosphor can be concentrated, and the fluorescent light which is excited and generated by the wavelength converter 14 can be also concentrated on the light-transmitting control wheel 15. However, the light-condensing lens L21 need not necessarily always be included. For instance, it may be applicable to concentrate fluorescent light generated by excitation of the wavelength converter 14 through the coupling lens 16 (CL2) on the light transmission-wheel 15.

As described above, by concentrating excitation light from the solid-state light source 10 and the fluorescent light on the light-transmitting control wheel 15, the color-mixing time can be shortened and the purity of color can be increased. Furthermore, the light-transmitting control wheel 15 can be downsized, so the miniaturization of the device is accomplished.

Embodiment 3

Figure 5A:
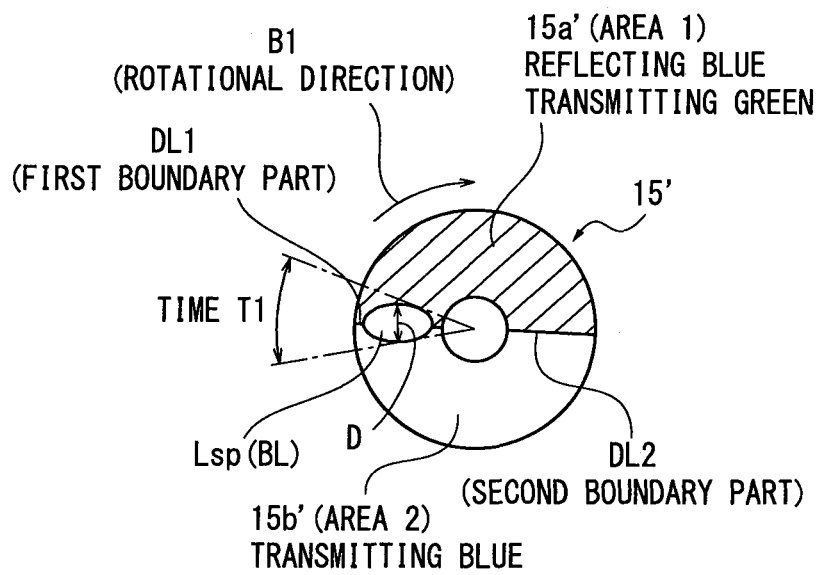
Figure 5B:
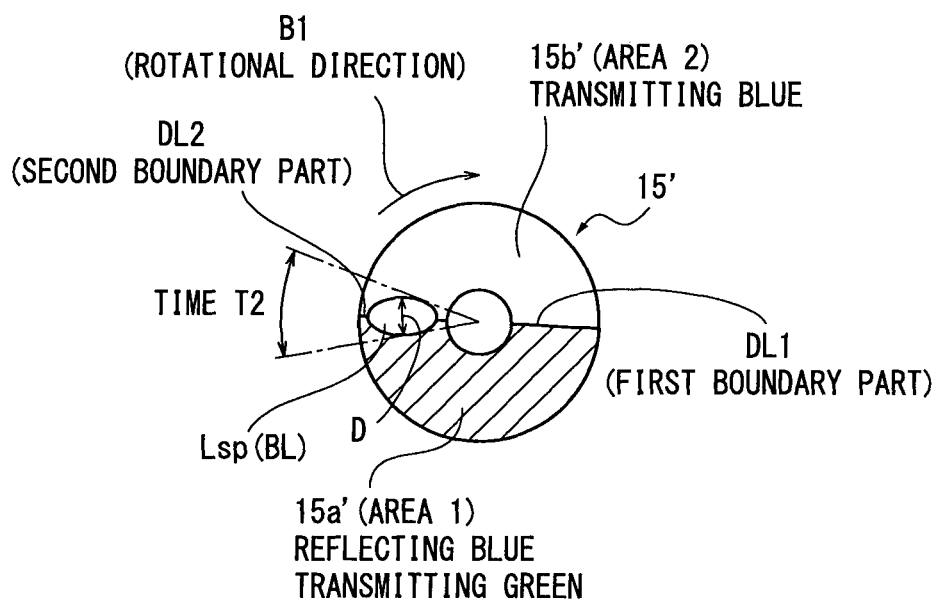

FIGS. 5A to 5C

FIG. 5 illustrates the function of Embodiment 3 of the present invention. In Embodiment 3, the illumination device 4 according to Embodiment 1 and shown in FIG. 1 is used. However, the light-transmitting control wheel 15 is changed to the light-transmitting control wheel 15' as shown in FIGS. 5A and 5B. FIG. 5A illustrates the function of the device at the boundary part DL1 when light (blue light from the solid-state light source 10 shown in FIG. 1 and green fluorescent light from the wavelength converter 14) is moved from the first dichroic filter (area 1) 15a' to the second dichroic filter (area 2) 15b'. FIG. 5B illustrates the function at the boundary part DL2 when light (blue light from the solid-state light source shown in FIG. 1 and green fluorescent light from the wavelength converter 14) is moved from the second dichroic filter 15b' to the first dichroic mirror 15a'. As illustrated in FIGS. 5A and 5B, the light-transmitting control wheel 15' has a first dichroic filter (area 1) 15a' and the second dichroic filter (area 2) 15b'. Each of the filters is formed within the range of 180 degrees in the circumferential direction. FIG. 5C illustrates schematically the on-off timing of the solid-state light source 10 according to the FIGS. 5A and 5B. The emission timing of the green light GL (green in figure), red light RL (red in figure) and blue light BL (blue in figure) corresponding to the above on-off timing is also illustrated in FIG. 5C.

In Embodiment 3, the illumination device 4 is controlled so that the emission of the light sources 10 and 11 can be controlled in the sequence as shown in FIG. 5C during the spoke time described in Embodiment 2.

Herein, the rotational direction of the light-transmitting control wheel 15' is in the clockwise direction as indicated by arrow B1 in FIGS. 5A and 5B. The irradiation spot Lsp is formed on the light-transmitting control wheel 15'. The spot Lsp is formed by the laser light (blue light BL) from the solid-state light source (LD light source) 10 in FIG. 1 or the fluorescent light from the wavelength converter 14 having the phosphor member (phosphor). The diameter of the irradiation spot Lsp in the circumferential direction of the light-transmitting control wheel 15' is indicated as D. The boundary line in a position where the irradiation spot Lsp is moved from the first dichroic filter (area 1) 15a' to the second dichroic filter (area 2) 15b' is a first boundary part DL1 as illustrated in FIG. 5A. The boundary line in a position where the irradiation spot Lsp is moved from the second dichroic filter (area 2) 15b' to the first dichroic filter (area 1) 15a' is a second boundary part DL2 as illustrated in FIG. 5B.

In addition, a period in which the irradiation spot Lsp irradiates the first boundary part DL1 and passes through the part is indicated as T1, as shown in FIG. 5A. A period in which the irradiation spot Lsp irradiates the second boundary part DL2 and passes through the part is indicated as T2, as shown in FIG. 5B. Namely, the periods (time) T1 and T2 are the time when the first dichroic filter 15a' and the second dichroic filter 15b' are switched over.

Under the above-described conditions, in the present embodiment, the solid-state light source 10 as an LD light source is turned off and the solid-state light source 11 for irradiating red light is turned on during the period T1. Both of the solid-state light sources 10 and 11 are turned off during the period T2. Thereby, red light is emitted from the illumination device 4 during the period T1 and no light is emitted from the illumination device 4 during the period T2.

During the period T2, the area where the light path of the blue light BL emitted from the solid-state light source 10 meets the light-transmitting control wheel 15 is changed from the second dichroic filter (area 2) 15b' to the first dichroic filter (area 1) 15a'. Because the solid-state light sources 10 and 11 are turned off during the period T2, a mixture of colors may not occur.

During the period T1, the area is changed from the first dichroic filter (area 1) 15a' to the second dichroic filter (area 2) 15b'. Because the solid-state light source 10 is turned off and only the solid-state light source 11 is turned on during the period T1, only red light can be emitted. Therefore, the purity of red color in the light emitted from the illumination device 4 can be improved.

Thus, in Embodiment 3, the color mixture can be prevented at the same time as the purity of color can be improved more.

Alternately, the device can be controlled so that the solid-state light sources 10 and 11 are both turned off during the period T1 and solid-state light source 10 is turned off and the solid-state light source 11 is switched on during the period T2.

In addition, the device can be also controlled so that the solid-state light source 10 is turned off and the solid-state light source 11 is turned on during both periods T1 and T2.

Modified Example 1 of Embodiment 3

FIG. 6A

Figure 6A:
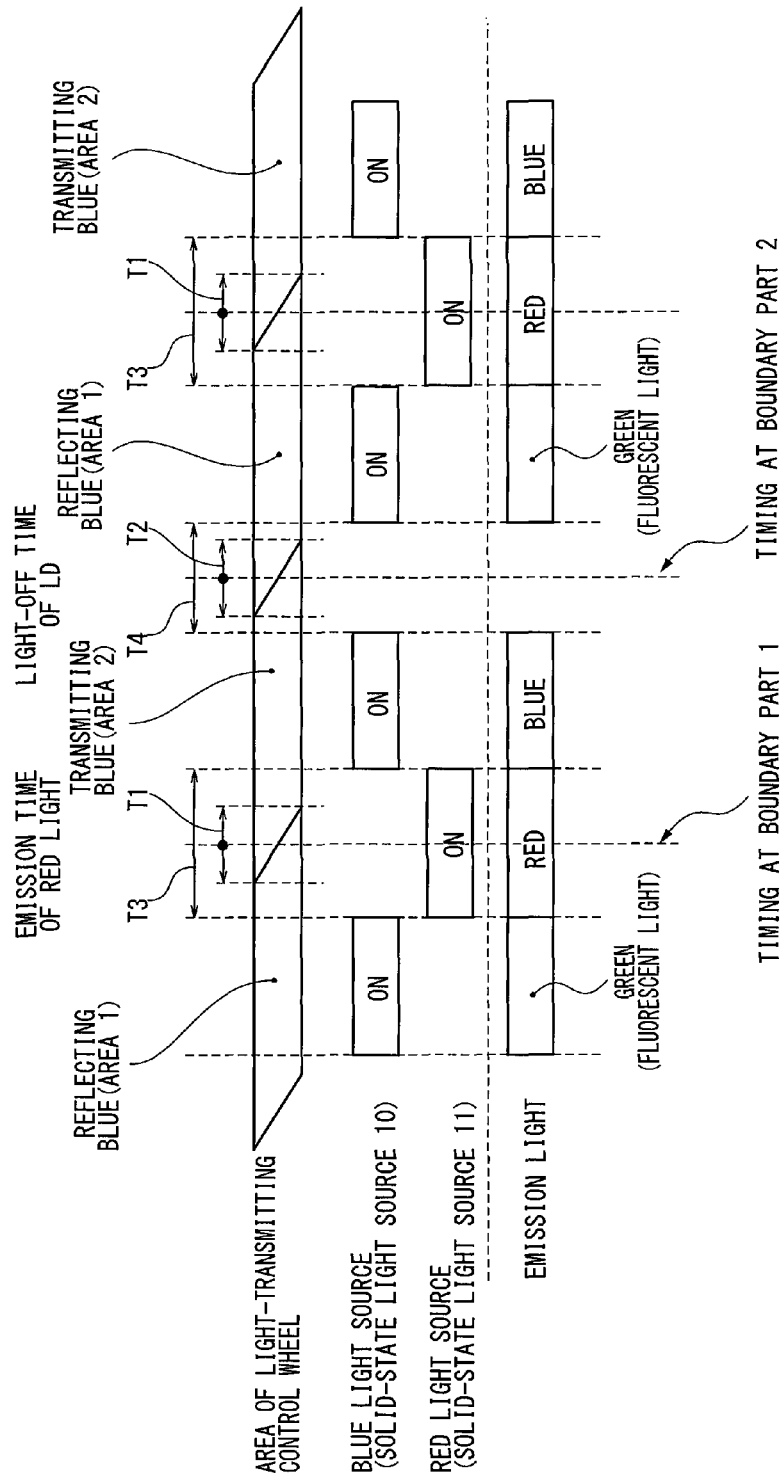
FIG. 6A is an explanatory view which illustrates a sequence of an example of a timing of light-emission of an illumination device according to Modified Example 1 of Embodiment 3 of the present invention.

Herein, the most preferable example is described with reference to FIG. 6A. As shown in FIG. 6A, a period in which the solid-state light source 11 is turned on and the red light is emitted is indicated as T3. The period T3 includes the period T1 in which the irradiation spot Lsp crosses the first boundary part DL1 and it is made to be longer than the period T1. The solid-state light sources 10 and 11 are controlled such that the solid-state light source 10 is turned off and the light source 11 is turned on during the period T3.

Similarly, a period in which both of the solid-state light sources 10 and 11 are turned off is indicated as T4. The period T4 includes the period T2 in which the irradiation spot Lsp crosses the second boundary part DL2 and is made to be longer than the period T2.

As described above, the device is controlled so that the period T3 includes the period T1 in which the irradiation spot Lsp crosses the first boundary part DL1 and the period T4 includes the period T2 in which the irradiation spot Lsp crosses the second boundary part DL2. In accordance with such control, the mixture of colors can be avoided and the generation of the ideal fundamental colors can be accomplished.

Herein, because the blue LD light source is used for the solid-state light source 10 and the solid-state light source such as an LED is used for the light source 11 of red light, these light sources 10 and 11 can be on-off controlled quickly. The time of performing such control is sufficiently shorter than the spoke time.

The control for emission of red light from the solid-state light source 11 (control ON) can be carried out during the period T4, not T3. Otherwise, the solid-state light source 11 can be turned on twice within one frame and controlled to be turned on in both T3 and T4 periods.

With the above-described configuration, the mixture of colors can be prevented and the generation of the ideal fundamental colors can be accomplished. The purity of color is improved.

Embodiment 4

FIG. 6B

Embodiment 4 shown in FIG. 6B is the example in which Embodiment 3 and the modified example 1 of Embodiment 3 are developed further.

In Embodiment 3 and the modified example 1 of Embodiment 3, the solid-state light sources 10 and 11 are both turned off during the period T2 but it is not always limited to the above. For instance, the solid-state light source (red light source) 11 is turned off and the solid-state light source (blue light source) 10 is turned on during the period T2. Thereby, blue light and green light are synthesized within the second boundary part DL2 in FIGS. 5A and 5B and cyan color light can be formed (generated) to be emitted from the illumination device 4. While the cyan light is emitted from the illumination device 4, a monochrome image corresponding to the image of cyan color is formed on the image-forming element 5. Because cyan light which is emitted from the illumination device 4 irradiates the monochrome image in the image-forming element 5, the cyan color image is projected and displayed on the display surface of the not-shown screen through the projection lens 7 in FIG. 1.

Similarly in this Embodiment 4, control is also carried out such as the solid-state light source 10 being turned off and only the solid-state light source 11 of red light being turned on to have red light emitted during the period T3.

Thus, the present embodiment is made to use mixed color light (cyan light) of blue light and green fluorescent light positively during the period T2 of the spoke time of the second boundary part DL2. During the period T3 including the period T1 (spoke time of first boundary part DL1), the solid-state light source 10 of LD light is turned off, the solid-state light source 11 of red light is turned on and red light is generated. On the other hand, during the period T2 of the spoke time of the second boundary part DL2, the solid-state light source 10 is continuously turned on, and cyan light which is a mixture of blue light and green fluorescent light is generated. Thereby, it is possible to generate brighter light (emission light).

Embodiment 5

FIGS. 7A to 7D

In the above-described Embodiment 1 shown in FIGS. 1-3, two light sources are used to generate each of green light GL, red light RL and blue light BL. The light sources are the solid-state light source (blue LD light source) 10 and the solid-state light source (red light source) 11. However, the present invention is not always limited to those. It is possible to generate each of green light GL, red light RL and blue light BL from only one solid-state light source. FIGS. 7A-7D illustrates such an example as Embodiment 5.

[Construction]

Figure 7A:
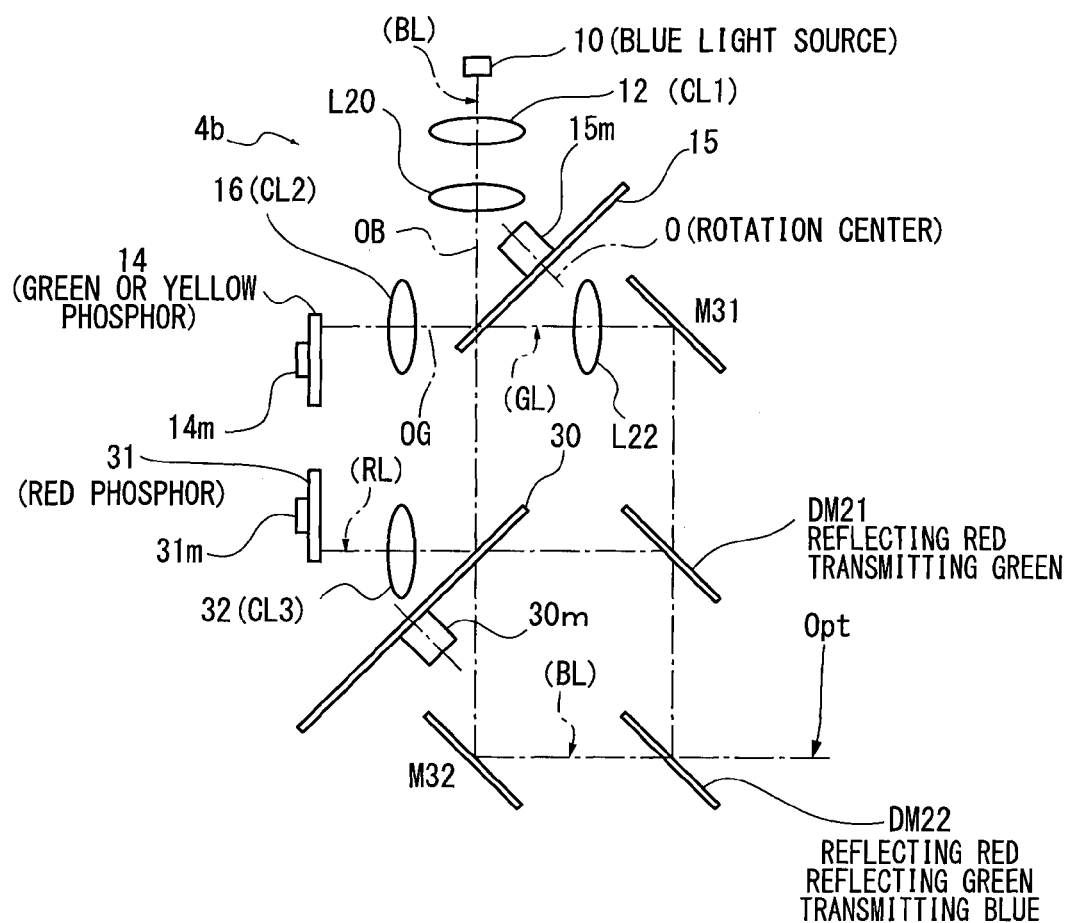
FIG. 7A is an optical view showing the illumination device according to Embodiment 5 of the present invention.

An illumination device 4b shown in FIG. 7A includes the solid-state light source 10, the coupling lenses 12 (CL1) and 16 (CL2), the wavelength converter 14 which is excited by blue laser light and generates green or yellow fluorescent light and the light-transmitting control wheel 15 similar to Embodiment 1.

Figure 7B:
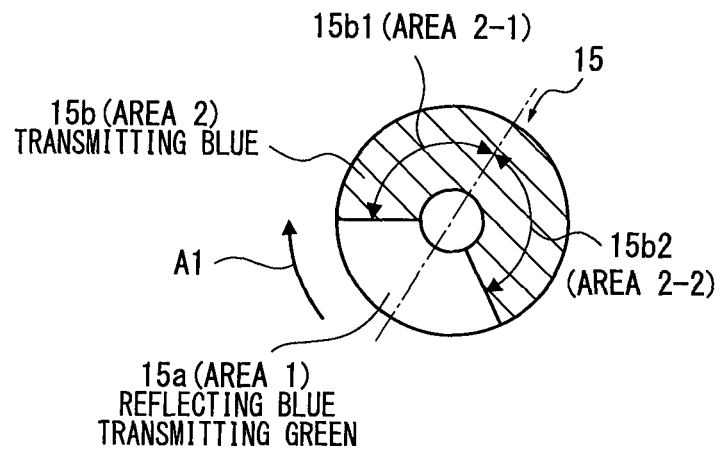
FIG. 7B and FIG. 7C are plan views of the two light-transmitting control wheels of the illumination device shown in FIG. 7A, as viewed from the perpendicular direction to surfaces of the wheels and the incident direction of excitation light.

The light-transmitting control wheel 15 includes, as shown in FIG. 7B and similar to FIG. 2A, the first dichroic filter (area 1) 15a and the second dichroic filter (area 2) 15b. The first dichroic filter 15a reflects the blue light and transmits the green light. The second dichroic filter 15b transmits the blue light. In the embodiment shown in FIG. 7A, the mirror M1 in Embodiment 1 is indicated as M31. Additionally, the solid-state light source 11 in Embodiment 1 is changed to a wavelength converter 31 which generates red fluorescent light and the dichroic mirror DM1 in Embodiment 1 is changed to a total reflection mirror M32. The dichroic mirror DM2 in Embodiment 1 is changed to a dichroic mirror DM22 which reflects the red light RL and the green light GL and transmits the blue light BL.

Herein, it is preferable for the red fluorescent light generated from the wavelength converter 31 to have the wavelength from 620 nm to 750 nm or the wavelength including this range.

In FIG. 7A, the illumination device 4b further includes a second light-transmitting control wheel 30. The second light-transmitting control wheel 30 is disposed between the light-transmitting control wheel 15 and the mirror M32 inclined at 45 degrees to the light path OB of blue light BL. The light-transmitting control wheel is rotated by a driving motor 30m. The driving motor 30m is controlled by the drive controller 3c.

Figure 7C:
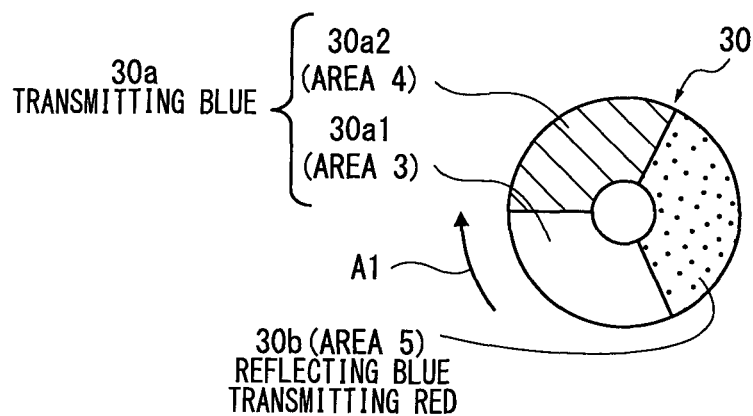

The light-transmitting control wheel 30 includes, as shown in FIG. 7C, a third dichroic filter (area 3) 30a and a fourth dichroic filter 30b. The third dichroic filter 30a includes two areas 30a1 (area 3) and 30a2 (area 4) and transmits the blue light BL. The fourth dichroic filter 30b includes the area (area 5) which reflects the blue light BL and transmits the red light RL.

As shown in FIGS. 7A and 7C, the area 30a1 (area 3) of the third dichroic filter 30a is similar to the first dichroic filter (area 1) 15a which reflects blue light BL and transmits green light GL. The area 30a2 (area 4) of the third dichroic filter 30a is similar to the area 15b1 (area 2-1) of the second dichroic filter 15b which reflects blue light BL. The fourth dichroic filter (area 5) 30b is similar to the area 15b2 (area 2-2) of the second dichroic filter 15b which reflects blue light BL.

The illumination device 4b in FIG. 7A further includes a wavelength converter 31 having a phosphor member (phosphor) which generates red fluorescent light (red light RL) by the excitation of blue laser light (blue light BL) and a coupling lens 32 (CL3 in embodiment 1) which concentrates the blue light BL on the wavelength converter 31. The red fluorescent light is generated by excitation of the blue laser light (blue light BL). The coupling lens 32 (CL3) is disposed so as to concentrate the blue light BL (blue laser light) on the wavelength converter 31 after the blue light BL is reflected by the fourth dichroic filter 30b of the light-transmitting control wheel 30 and changes the red fluorescent light (red light RL) dispersing from the wavelength converter 31 by the excitation of the blue light BL into a parallel light flux. The red light enters the fourth dichroic filter 30b of the light-transmitting control wheel 30.

The wavelength converter 31 has a disc-like shape and rotates by the driving motor 31m. The driving motor 31m is controlled by the drive controller 3c. In this regard, the wavelength converter 31 rotates preferably at a certain velocity. That is, the incident position of the blue light BL can be changed by such rotation of the wavelength converter 31 so that the phosphor included in the wavelength converter 31 can be cooled while not being deteriorated.

The illumination device 4b in FIG. 7A further includes a dichroic mirror DM21 which reflects the red light RL transmitted through the fourth dichroic filter 30b in the light-transmitting control wheel 30 towards the dichroic mirror DM22. The dichroic mirror DM21 is disposed between the mirror M31 and the dichroic mirror DM22. The dichroic mirror DM21 transmits green light GL towards the dichroic mirror DM22 and reflects the red light RL towards the dichroic mirror DM22. The dichroic mirror DM22 reflects both of the green light GL and the red light RL and transmits the blue light BL, and then it concentrates each light on the emission light path Opt.

[Functions]

Figure 7D:
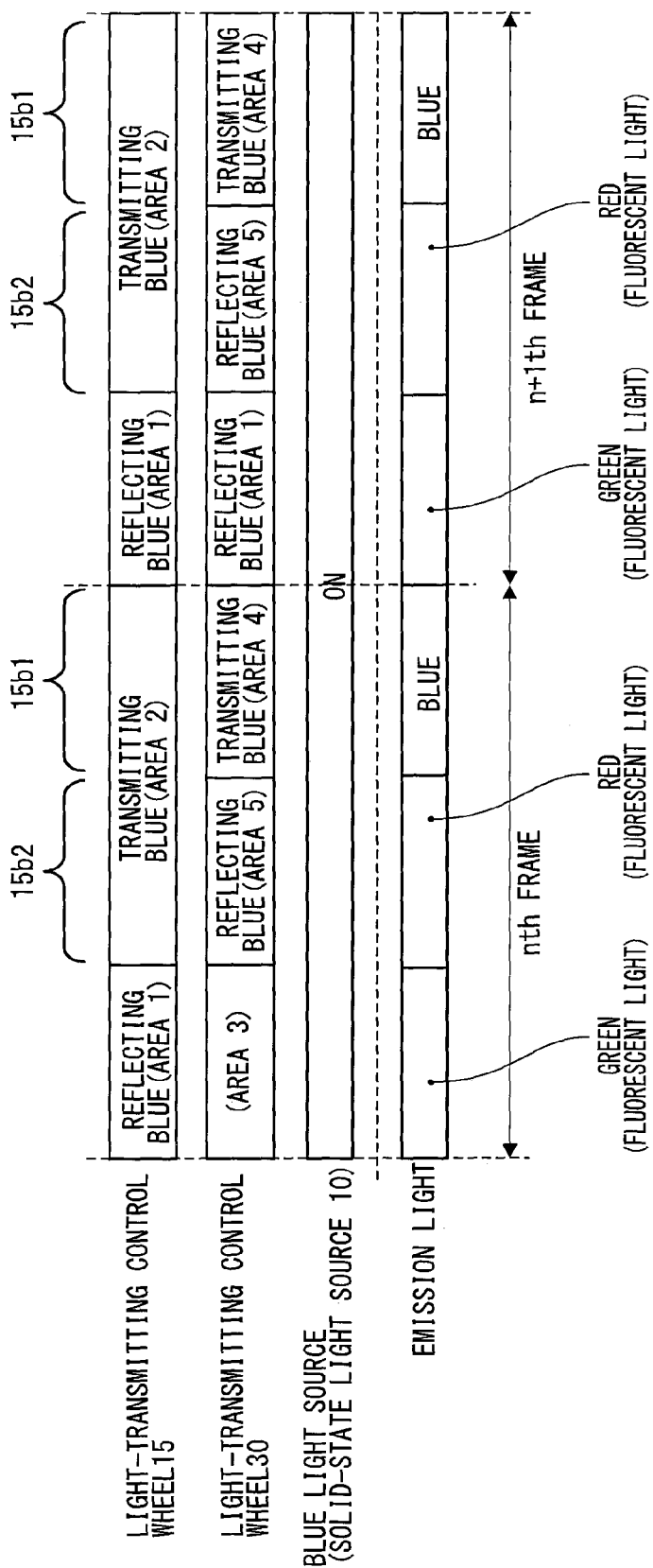
FIG. 7D is an explanatory view which illustrates a sequence of an example of color generation of the illumination device according to embodiment 5 as shown in FIG. 7A.

The functions of the illumination device 4b having the above-described configuration are described in accordance with the color-generation sequence in FIG. 7D.

The control as shown in the color-generation sequence shown in FIG. 7D is performed by the drive controller 3c in FIG. 1. The solid-state light source is continuously turned on by the control of drive controller 3c. The light-transmitting control wheels 15 and 30 rotate in synchronization with the control of the drive controller 3c.

The continuously turned-on solid-state light source 10 generates the laser light (excitation light) dispersing blue light. The coupling lens 12 (CL1) changes the dispersing blue laser light from the solid-state light source 10 into parallel blue light BL, so that the blue light BL enters the light-transmitting control wheel 15.

[Generation of Green Light]

The light-transmitting control wheel 15 reflects the blue light BL towards the wavelength converter 14 when the first dichroic filter (area 1) 15a is located on the exciting light path of blue light BL emitter from the solid-state light source 10. The reflected blue light BL is concentrated by the coupling lens 16 (CL2) towards the wavelength converter 14. Then, the green or yellow fluorescent light disperses from phosphor in the wavelength converter 14 by the excitation. The yellow or green fluorescent light becomes a parallel light flux through the coupling lens 16 (CL2) and the first dichroic filter (area 1) 15a selects and transmits the green fluorescent light. The transmitted green light GL is further transmitted through the dichroic mirror DM21 after being reflected by the mirror M31, and then is reflected by the dichroic mirror DM22 towards the illumination guide system 6 shown in FIG. 1.

While the above is performed, the drive controller 3c controls the driving motor 14m so that the wavelength converter 14 rotates at a certain velocity. By such rotation, the incident position of the blue excitation light is changed and phosphor in the wavelength converter 14 can be cooled while not being deteriorated.

[Generation of Red Light]

In accordance with the rotation of light-transmitting control wheels 15 and 30 to the arrow A1 direction, the area 15b2 (area 2-2) of the second dichroic filter (area 2) 15b in the light-transmitting control wheel 15 is located in the light path of the blue light BL (excitation light) emitted from the solid-state light source 10. At this time, the blue light BL is transmitted through the dichroic filter (area 2) 15b and enters the light-transmitting control wheel 30. Corresponding to the above, the fourth dichroic filter (area 5) 30b is located in the light path of the blue light BL which is transmitted through the second dichroic filter 15b. The fourth dichroic filter 30b reflects the blue light towards the wavelength converter 31. The reflected blue light is concentrated on the wavelength converter 31 through the coupling lens 32 (CL3). Phosphor in the wavelength converter 31 generates dispersing red fluorescent light. The dispersing red fluorescent light becomes a parallel light flux (red light RL) through the coupling lens 32 (CL3). The red light RL is transmitted through the fourth dichroic filter (area 5) 30b and is reflected by the dichroic mirror DM21 and is also reflected by the dichroic mirror DM22 towards the illumination guide system 6 shown in FIG. 1.

While the above is performed, the drive controller 3c controls the driving motor 31m so that the wavelength convertor 31 rotates at a certain velocity. By such rotation, the incident position of the blue excitation light is changed and phosphor used in the wavelength converter 31 can be cooled while not being deteriorated.

[Generation of Blue Light]

In accordance with the rotation of the light-transmitting control wheels 15 and 30 to the arrow A1 direction, the area 15b1 (area 2-1) of the second dichroic filter (area 2) 15b in the light-transmitting control wheel 15 is located in the light path of blue light BL. The blue light BL is transmitted through the area 15b1 (area 2-1). Corresponding to the above, the area 30a2 (area 4) of the third dichroic filter 30a in the light-transmitting control wheel 30 is located in the light path of blue light BL transmitted through the area 15b1 (area 2-1). Thereby, the blue light BL is further transmitted through the area 30a2 (area 4) of the light-transmitting control wheel 30. The blue light BL is reflected by the mirror M32 and transmitted through the dichroic mirror DM22, and then guided towards the illumination light guide system 6 shown in FIG. 1.

According to the illumination device 4b having the above-described configuration, green light (green fluorescent light) GL, red light (red fluorescent light) RL and blue light BL are emitted in this order per each frame while the light-transmitting control wheels 15 and 30 rotate one revolution. For instance, green light GL, red light RL and blue light BL are emitted in this order per frame according to the color-generation sequences indicated as nth frame and n+1th frame in FIG. 7D.

Modified Example of Embodiment 5

The drive controller 3c in embodiment 5 controls the driving motor 31m so that the wavelength converter 31 rotates at a certain velocity. By such rotation, the incident position of blue excitation light is changed and phosphor used in the wavelength converter 31 can be cooled while not being deteriorated. However, the embodiments in present invention are not always limited to the above.

For instance, the rotation of the wavelength converter 31 can be controlled on and off. In this regard, the incident position of blue light BL can be changed by rotating the wavelength converter 31 so that the phosphor used in the wavelength converter 31 can be cooled while not being deteriorated.

The rotation of the wavelength converter 31 can be controlled per certain angle by certain conditions. Namely, when the phosphor used in the wavelength converter 31 is deteriorated on some level, the wavelength converter 31 rotates at a certain angle, so that the incident position of excitation light can be changed and the condition of fluorescent light emitted from the phosphor is made to be the same as the initial condition.

Furthermore, the wavelength converter 31 is configured to rotate by the driving motor 31m in order to extend its operating life, but it is not necessary for the wavelength converter 31 to be configured to rotate by the driving motor 31. It may be configured in a fixed mount type.

Embodiment 6

Figure 8A:
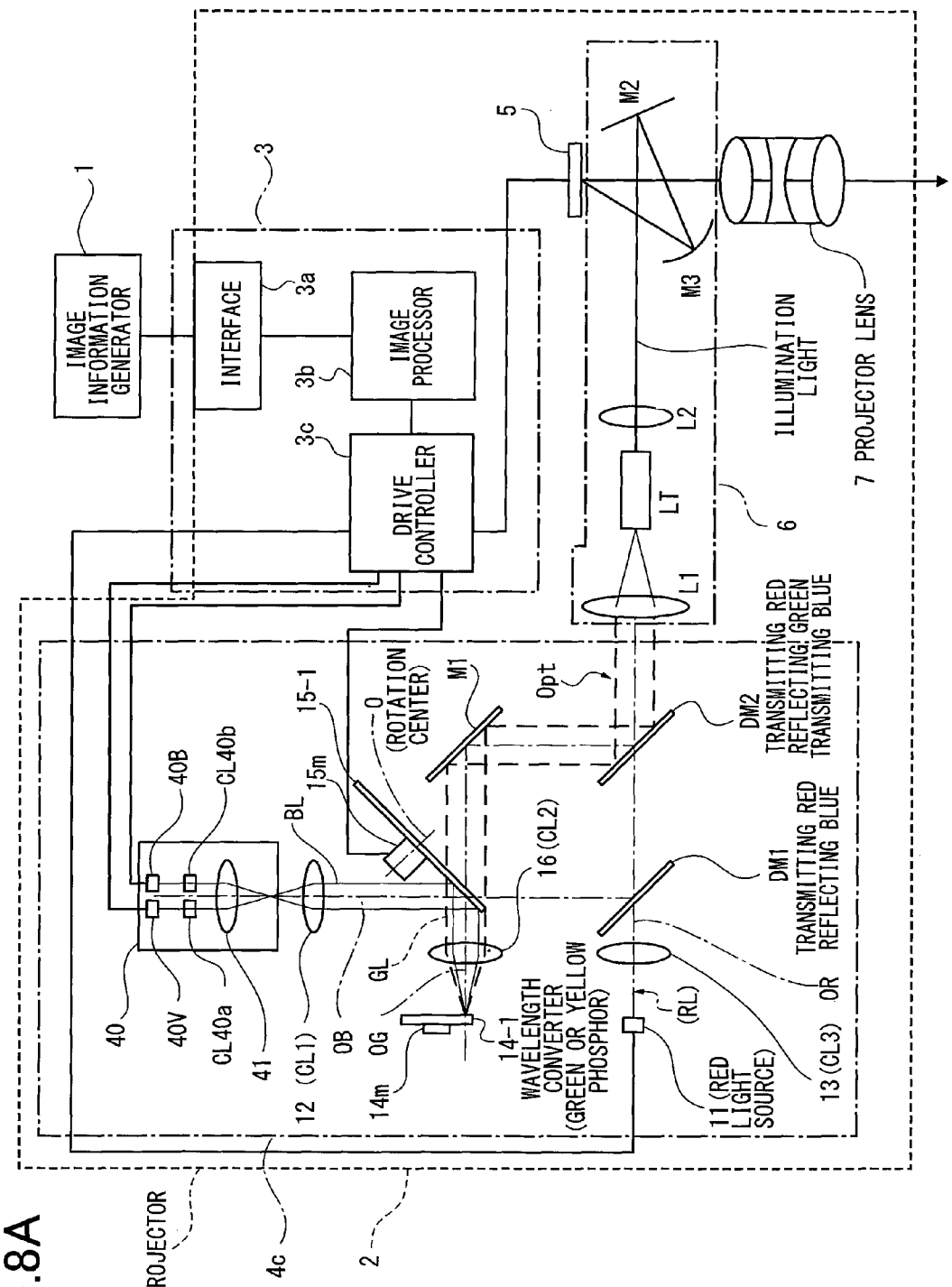
FIG. 8A is an optical view showing a projector having an illumination device according to Embodiment 6 of the present invention.
Figure 8B:
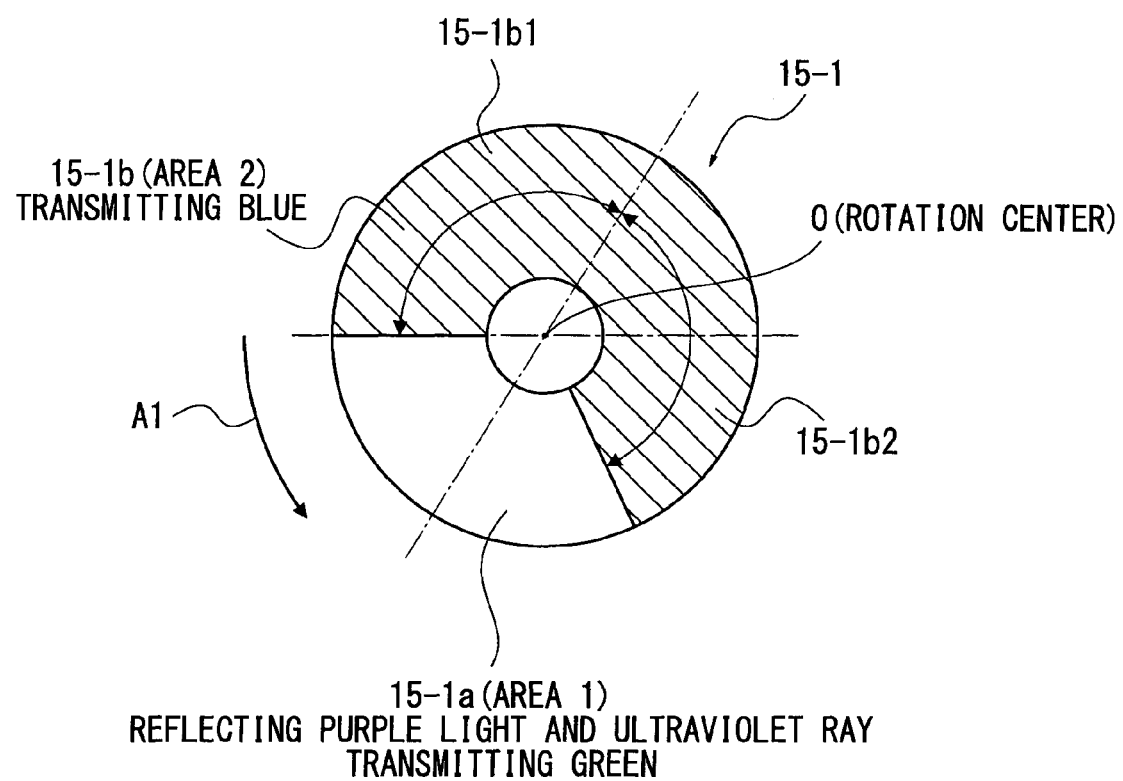
FIG. 8B is a plan view of a light-transmitting control wheel of the illumination device shown in FIG. 8A, as viewed from the perpendicular direction to a surface of the light-transmitting control wheel and the incident direction of excitation light.

FIGS. 8A and 8B

In the above-described embodiments, semiconductor laser (hereinafter, referred to as LD) emitting blue light is used for the solid-state light source 10. Green or yellow phosphor emitting green or yellow fluorescent light by the excitation of blue excitation light is used for the wavelength convertor 14. However, the present invention is not always limited to the above.

For instance, as shown in FIG. 8A, the illumination device 4c can be configured to include a light source part 40 of an excitation light source emitting blue light for exciting the green or yellow fluorescent light and light for illumination.

The light source part 40 includes: a solid-state light source 40V of LD or LED emitting light of the wavelength of purple or ultraviolet rays; a solid-state light source (blue light source) 40B of LD or LED emitting light of the wavelength of blue; lenses CL40a and CL40b where the light from the solid-state light sources 40V and 40B becomes parallel light fluxes; and a light-condensing lens (light-condensing element) 41 which concentrates light fluxes emitted from the solid-state light sources 40V and 40B. Herein, the solid-state light sources 40B and 40V are disposed in parallel. In Embodiment 6, excitation light includes purple light and ultraviolet rays from the light source 40V and blue light from the light source 40B.

The light-transmitting control wheel 15-1 includes the first dichroic filter (area 1) 15-1a and the second dichroic filter (area 2) 15-1b as shown in FIG. 8B. In Embodiment 6, the first dichroic filter 15-1a reflects purple light and ultraviolet rays in excitation light and transmits green fluorescent light. The second dichroic filter 15-1b transmits only blue light in excitation light.

In the above configuration, when the light-transmitting control wheel 15-1 rotates and the first dichroic filter 15-1a is located on the light path from the light source part 40, the solid-state light source (ultraviolet rays source) 40V is turned-on and the solid-state light source (blue light source) 40B is turned-off. Purple light and ultraviolet rays emitted from the light source 40V enter the wavelength converter 14-1 and excite phosphor therein. Thereby green or yellow fluorescent light is emitted from the wavelength converter 14-1. The green or yellow fluorescent light becomes a parallel light flux through the coupling lens 16 (CL2). The first dichroic filter 15-1a transmits green fluorescent light after selecting from the green and yellow fluorescent light. Green light is reflected by the mirror M1 and the dichroic mirror DM2 and the light enters the light-condensing lens (light-condensing element) L1 in the illumination light guide system 6.

In addition, when the second dichroic filter 15-1b is located in the light path of light emitted from the light source part 40, the solid-state light source (light source for purple light and ultraviolet rays) 40V is turned-off and the solid-state light source (blue light source) 40B is turned-on. Thereby, the blue light BL is transmitted through the second dichroic filter 15-1b and reflected by dichroic mirror DM1, transmitted through the dichroic mirror DM2 and the light enters the light-condensing lens L1.

Regarding the generation of red light; the description thereof is omitted here because it is similar to Embodiment 1.

Additionally, the light source part 40 in Embodiment 6 can be also applied to the devices according to Embodiments 2 and 5 as the alternative excitation light source to the solid-state light source 10 shown in FIGS. 4A and 7A.

Embodiment 7

Figure 9A:
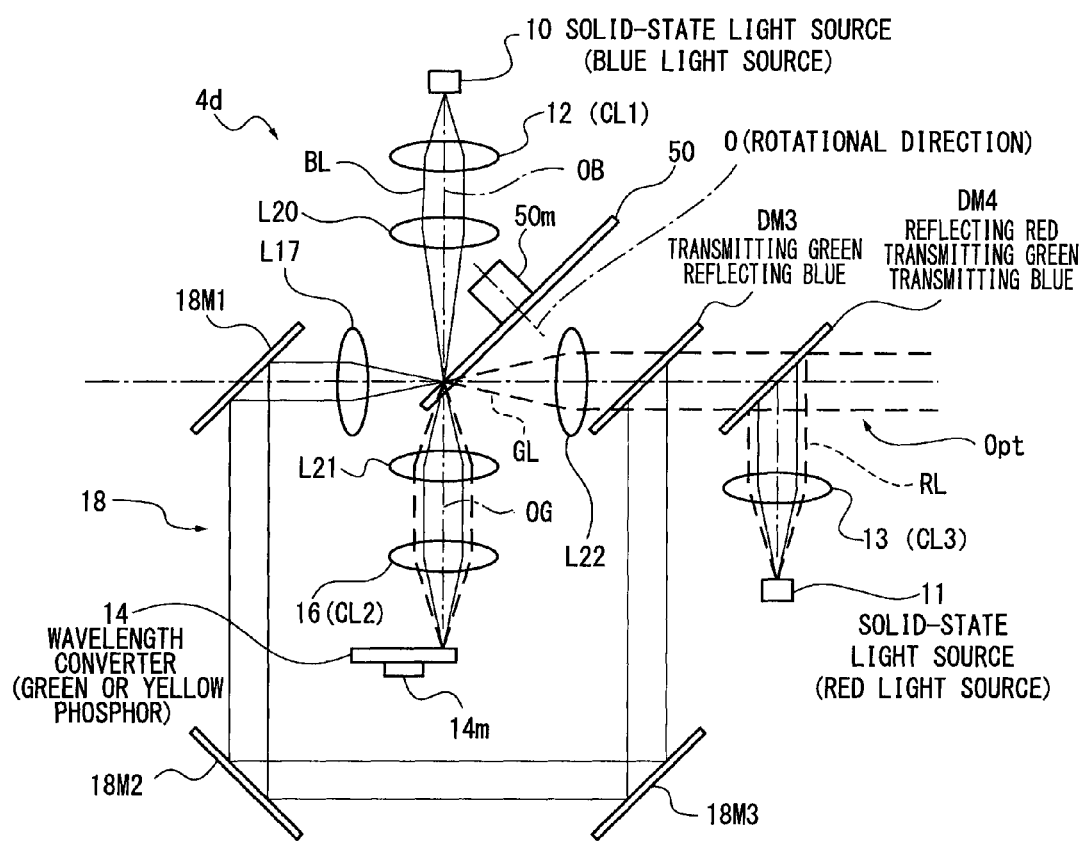
FIG. 9A is an optical view showing an illumination device according to Embodiment 7 of the present invention.
Figure 9B:
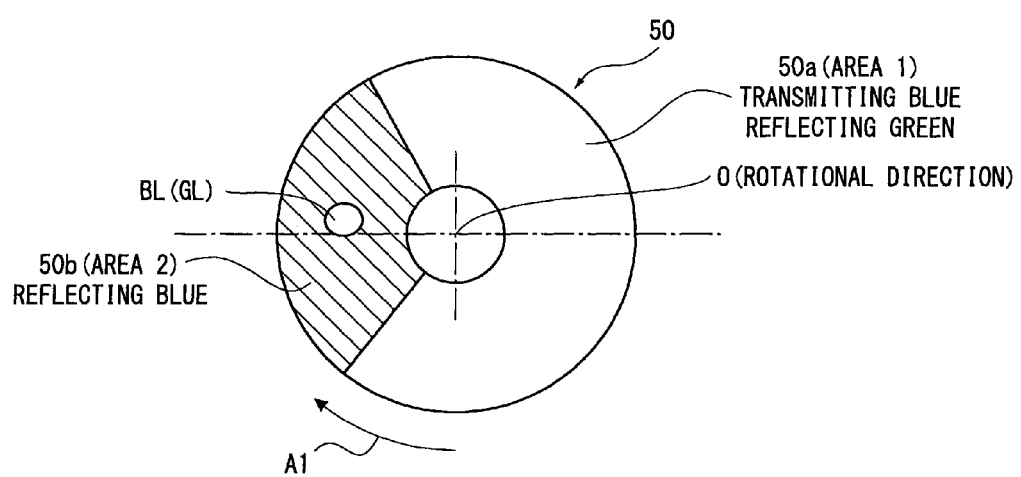
FIG. 9B is a plan view of a light-transmitting control wheel of the illumination device shown in FIG. 9A, as viewed from the perpendicular direction to a surface of the light-transmitting control wheel and the incident direction of excitation light.

FIGS. 9A and 9B

In the above-described Embodiments 1-6 and some modified examples thereof, the wavelength converter 14 is disposed in the reflection light path of excitation light from the light-transmitting control wheel 15 as a light path splitter. In particular, in Embodiment 2 shown in FIG. 4 for example, blue excitation light emitted from the solid-state light source 10 enters the wavelength converter 14 after it is reflected by the first dichroic filter 15a in the light transmission wheel 15. Therefore, green or yellow fluorescent light is generated by the excitation of phosphor by the blue excitation light. The green fluorescent light is transmitted through the dichroic filter 15a after selecting from the green and yellow fluorescent light. The solid-state light source 10, light-transmitting control wheel 15 and wavelength converter 14 are disposed to complete the above-described operation. However, the present invention is not always limited to the above.

For instance, such an illumination device 4d according to Embodiment 7 as shown in FIG. 9A is applicable. In the illumination device 4d, the wavelength converter 14 is disposed in the transmission light path of blue excitation light (blue light BL) of the light-transmitting control wheel 50. The illumination device 4d includes: the solid-state light source 10 emitting excitation light having the wavelength of blue light; a coupling lens 12 (CL1) where blue light BL becomes a parallel light flux; and a light-condensing lens L20 which concentrates the blue light BL. Herein, the coupling lens 12 (CL1) and the condensing lens L20 constitute the light-condensing system.

The illumination device 4d further includes the light-transmitting control wheel 50 wherein blue light BL concentrated by the condensing lens L20 enters.

The light-transmitting control wheel 50 further includes, as shown in FIG. 9B, a first dichroic filter (area 1) 50a and a second dichroic filter (area 2) 50b. The first dichroic filter transmits the blue excitation light (blue light) BL and reflects green fluorescent (green light GL). The second dichroic filter 50*b* reflects blue excitation light (blue light BL). Herein, the first dichroic filter 50*a* is provided in the light-transmitting control wheel 50 within the range of 240 degrees in the circumferential direction. The second dichroic filter 50*b* is provided in an area except the area provided with the first dichroic filter 50*a*.

Furthermore, the illumination device 4*d* includes, as shown in FIG. 9A: a light-condensing lens L21 where the blue light BL transmitted through the first dichroic filter 50*a* becomes a parallel light flux; a coupling lens 16 (CL2) which concentrates blue light BL of the parallel light flux; and the wavelength converter 14 where the concentrated blue light enters.

The wavelength converter 14 emits green or yellow fluorescent light excited by blue light BL. Green or yellow fluorescent light becomes a parallel light flux through the coupling lens 16, and then enters the light-transmitting control wheel 50 after the light is concentrated by the light-condensing lens L21. Green fluorescent light (green light GL) is reflected by the first dichroic filter 50*a* after the green fluorescent light is selected from green and yellow fluorescent light.

The illumination device 4*d* includes: a light-condensing lens L22 where the green light GL reflected by the first dichroic filter 50*a* becomes a parallel light flux; a dichroic mirror DM3 which transmits the parallel green light flux GL and reflects blue light BL; and a dichroic mirror DM4 which transmits green light GL transmitted through the dichroic mirror DM3 and blue light BL reflected by the dichroic mirror DM3 and reflects red light RL towards the illumination light guide system (relay optical system) 6 shown in FIG. 1.

The illumination device 4*d* includes: the solid-state light source 11 which generates red light RL; and a coupling lens 13 (CL3) where red light RL emitted from the solid-state light source 11 becomes a parallel light flux and enters the dichroic mirror DM4.

The illumination device 4*d* further includes an alternative light path 18. When the light path of blue light BL emitted from the solid-state light source 10 crosses the second dichroic filter 50*b*, blue light BL is reflected by the second dichroic filter 50*b*. The reflected blue light BL is guided towards the dichroic mirror DM3 through the alternative light path 18. The alternative light path 18 include's a light-condensing lens (light-condensing element) L17 and a plurality of reflection mirrors 18M1, 18M2 and 18M3.

[Function]

In the present embodiment, the driving motor 50*m* is controlled by the drive controller 3*c* to rotate the light-transmitting control wheel 50 in the arrow A1 direction of FIG. 9B. Herein, the first dichroic filter 50*a* and the second dichroic filter 50*b* in the light-transmitting control wheel 50 alternately come across the light path of the blue light BL emitted from the solid-state light source 10.

With the rotation, the drive controller 3*c* in FIG. 1 controls the solid-state light source 10 to be turned-on and the solid-state light source 11 to be turned-off when the halves of the first and second dichroic filters 50*a* and 50*b* in a circumferential direction are located in the light path of the blue light BL. Thereby blue light BL is emitted from the light source 10. Blue light BL emitted from the light source 10 becomes a parallel blue-light flux BL through the coupling lens 12. The light flux is concentrated by the condensing lens L20 and enters the light-transmitting control wheel 50.

When the latter half of the first dichroic filter 50*a* is located in the light path of blue light BL, the drive controller 3*c* controls the solid-state light source 10 to be turned-off and the solid-state light source 11 to be turned-on. Thereby red light RL is emitted from the light source 11.

[Generation of Blue Light]

When the second dichroic filter 50*b* is located in the light path of blue light BL emitted from the solid-state light source 10, blue light BL enters the alternative light path 18 after being reflected by the second dichroic filter 50*b*. Blue light BL passes the alternative light path 18 and is guided to the dichroic mirror DM3. After being reflected by the dichroic mirror DM3 and transmitted through the dichroic mirror DM4, blue light BL is guided to the illumination light guide system 6 shown in FIG. 1.

[Generation of Green Light]

When the first half of the first dichroic filter 50*a* in the circumferential direction is located in the light path of blue light BL emitted from the solid-state light source 10 following the second dichroic filter 50*b*, and the light source 10 is turned-on, blue light BL is transmitted through the first dichroic filter 50*a*. The transmitted blue light BL becomes a parallel light flux through the light-condensing lens L21. The blue light flux is concentrated by the coupling lens 16 and enters the wavelength converter 14 disposed in the transmission light path of blue light BL.

Herein, dispersing green and yellow fluorescent light is generated from green and yellow phosphor in the wavelength converter 14 by the excitation of blue light. Dispersing green and yellow fluorescent light becomes a parallel light flux through the coupling lens 16. The light flux enters the dichroic filter 50*a* after being concentrated by the light-condensing lens L21. The first dichroic filter selects green light GL from the light flux and reflects the green light GL. The reflected green light GL is transmitted through the dichroic mirrors DM3 and DM4 after becoming a parallel light flux through the light-condensing lens L22, and then guided to the illumination light guide system (relay optical system) 6 shown in FIG. 1.

[Generation of Red Light]

When the second half of the first dichroic filter 50*a* is located in the light path of the blue light BL, the solid-state light source 10 is turned-off and the solid-state light source 11 is solely turned-on. Red light RL emitted from the solid-state light source 11 is guided towards the illumination light guide system (relay optical system) 6 shown in FIG. 1 through the coupling lens 13 and dichroic mirror DM4.

Accordingly, while the light-transmitting control wheel 50 rotates one revolution, blue light BL, green light GL and red light RL are guided to the illumination light guide system 6 in this order at equal intervals.

Embodiment 8

FIG. 10

In Embodiment 5 shown in FIG. 7A, the semiconductor laser (hereinafter, referred to as LD) or the LED is used for the solid-state light source 10. The wavelength converters 14 and 31 as examples include green and red phosphor. However the present invention is not always limited to those.

Figure 10A:
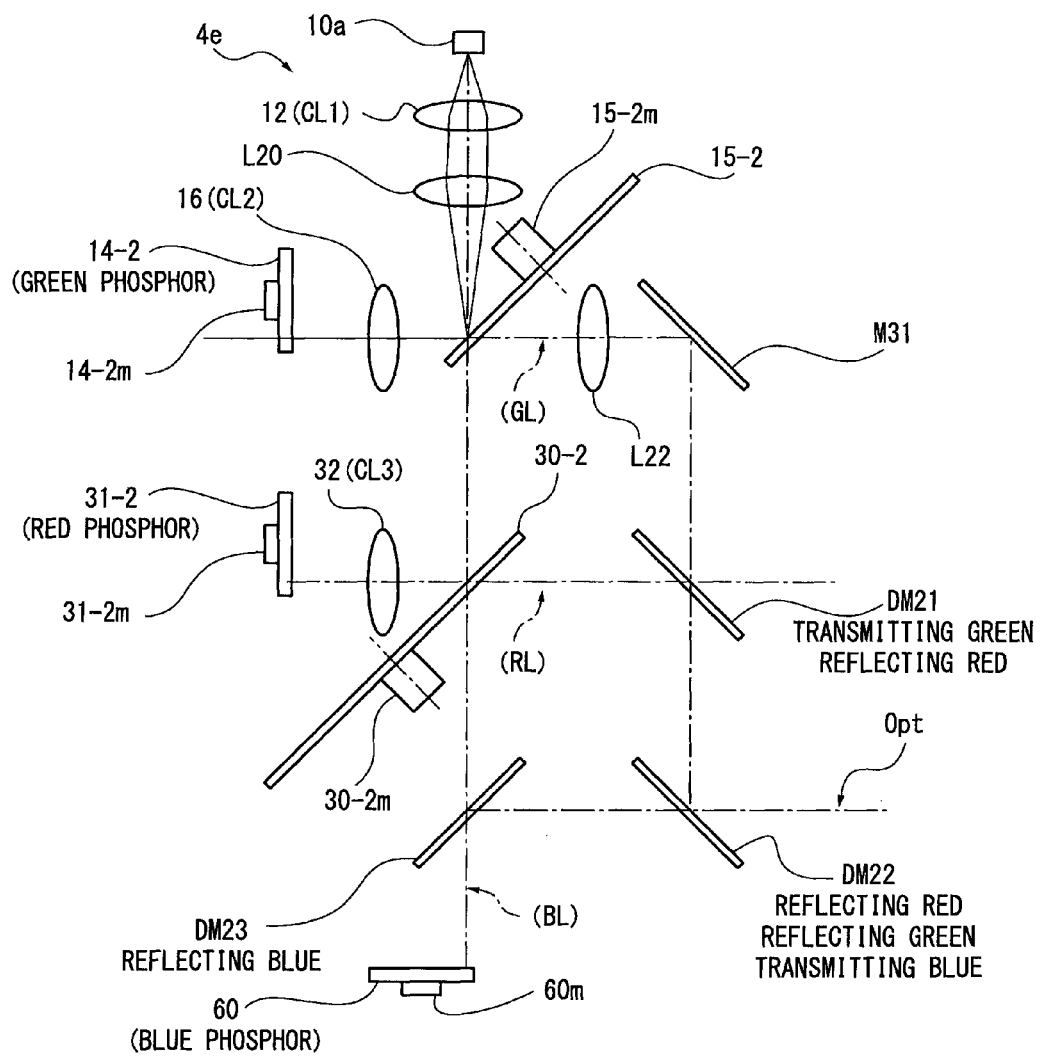
FIG. 10A is an optical view showing an illumination device according to Embodiment 8 of the present invention.
Figure 10B:
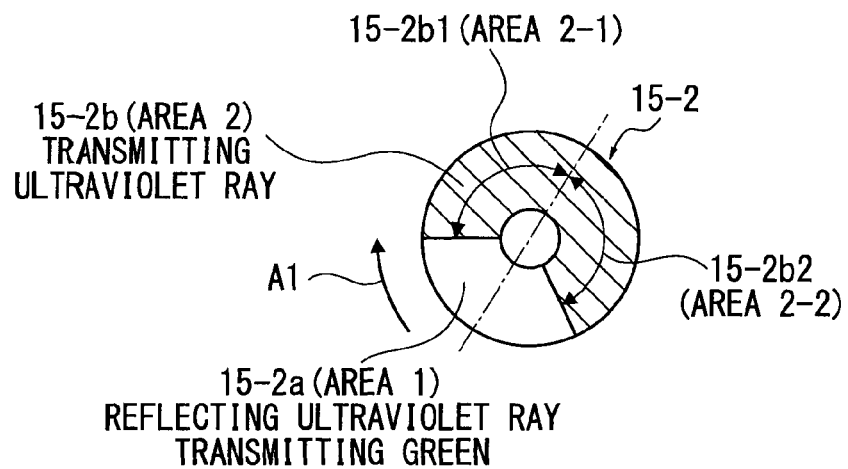
FIG. 10B and FIG. 10C are plan views of two light-transmitting control wheels of the illumination device according to Embodiment 8 as shown in FIG. 10A, as viewed from the perpendicular direction of surfaces of the wheels and the incident direction of excitation light.
Figure 10C:
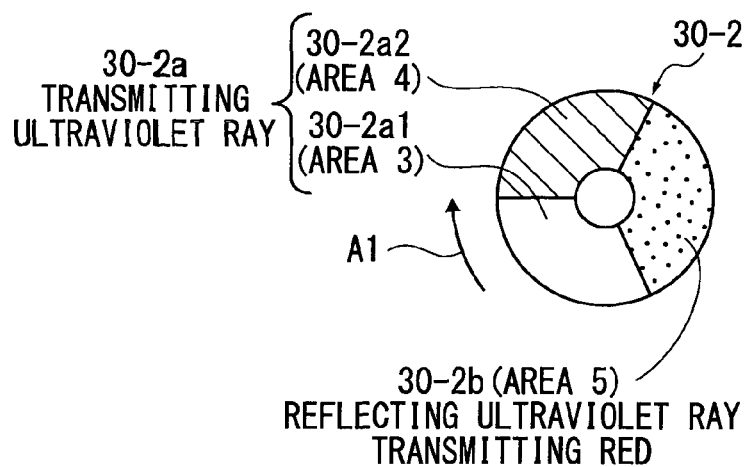

For instance, as shown in FIGS. 10B and 10C, the LD or LED which generates ultraviolet rays for excitation light can be used alternatively for the solid-state light source 10 shown in FIG. 7A. FIG. 10A illustrates an illumination device 4*e* according to Embodiment 8. In the illumination device 4*e* in Embodiment 8, the same numerals and characters as Embodiment 5 shown in FIG. 7A are used to represent similar constitutions.

In Embodiment 8, because the solid-state light source 10a emits ultraviolet rays, phosphor which generates green fluorescent light by excitation of ultraviolet rays is used for a wavelength converter 14-2. Phosphor which generates red fluorescent light by excitation of ultraviolet rays is used for a wavelength converter 31-2. The wavelength converters 14-2 and 31-2, similar to the wavelengths 14 and 31, rotate by driver motors 14-2m and 31-2m so as to prevent the deterioration of phosphor.

As a light path-branching member, light-transmitting control wheels 15-2 and 30-2 which reflect or transmit ultraviolet rays are included. In Embodiment 8, the illumination device further includes: a dichroic mirror DM23 which transmits ultraviolet rays transmitted through the light-transmitting control wheels 15-2 and 30-2 and reflects blue light towards a mirror DM22; and a wavelength converter 60 having a disc-like shape. The wavelength converter 60 generates blue fluorescent light excited by ultraviolet rays transmitted through the dichroic mirror DM23. The wavelength converter 60 includes phosphor which generates blue fluorescent light by excitation of ultraviolet rays. It is appropriate for blue fluorescent light generated from the wavelength converter 60 to have the wavelength from 420 nm to 460 nm or the wavelength including this range.

In addition, the wavelength converter 60 also rotates by the drive motor 60m and is controlled similar to the wavelength converters 14-2 and 31-2 so as to prevent the deterioration of phosphor.

In the present embodiment, as shown in FIG. 10B, ultraviolet rays as excitation light are reflected and green light GL is transmitted through the first dichroic filter (area 1) 15-2a. Ultraviolet rays are transmitted through the area 15-2b1 (area 2-1) and the area 15-2b2 (area 2-2) in the second dichroic filter (area 2) 15-2b. Moreover, as shown in FIG. 10C, ultraviolet rays are transmitted through the area 30-2a1 (area 3) and area 30-2a2 (area 4) of the third dichroic filter 30-2a (third filter) in the light-transmitting control wheel 30-2 of the second light path-branching member. In the area 30-2b (area 5) of the fourth dichroic filter (area 5) 30-2b, ultraviolet rays are reflected and red light is transmitted.

[Function]

The function of the illumination device 4e having the above-described constituent will be hereinafter described with reference to FIGS. 10A-10C.

The drive controller 3c illustrated in FIG. 1 controls the solid-state light source 10a to be turned-on continuously and controls the rotation of light-transmitting control wheels 15-2 and 30-2 in synchronization.

The solid-state light source 10a generates dispersing ultraviolet laser light (excitation light) continuously. The dispersing laser light becomes a parallel light flux through the coupling lens 12 (CL1) and enters the light-transmitting control wheel 15-2.

[Generation of Green Light]

In Embodiment 8, when the first dichroic filter (area 1) 15-2a locates in the light path of excitation light (ultraviolet rays), ultraviolet rays are reflected towards the wavelength converter 14-2. The reflected ultraviolet rays are concentrated on the wavelength converter 14-2 through the coupling lens 16 (CL2). The phosphor in the wavelength converter 14-2 is excited and generates dispersing green fluorescent light. The dispersing green fluorescent light becomes a parallel green light flux GL through the coupling lens 16 (CL2). Green light GL is transmitted through the first dichroic filter (area 1) 15-2a, reflected by the mirror M31, transmitted through the dichroic mirror DM21, and reflected towards the illumination light guide system 6 through the dichroic mirror DM22.

[Generation of Red Light]

Corresponding to the rotation of the light-transmitting control wheels 15-2 and 30-2 in the arrow A1 direction, the area 15-2b2 (area 2-2) of the second dichroic filter (area 2) 15-2b locates in the light path of excitation light (ultraviolet rays). Herein, ultraviolet rays are transmitted through the second dichroic filter (area 2) 15-2b and enter the light-transmitting control wheel 30-2. With this, the fourth dichroic filter (area 5) 30-2b locates in the light path of ultraviolet rays transmitted through the second dichroic filter 15-2b and reflects ultraviolet rays towards the wavelength converter 31-2. The reflected ultraviolet rays are concentrated on the wavelength converter 31-2 by a coupling lens 32 (CL3). The phosphor in the wavelength converter 31-2 is excited by the light and generates dispersing red fluorescent light (red light RL). Red light RL becomes a parallel red light flux RL through the coupling lens 32 (CL3). Red light RL is transmitted through the fourth dichroic filter (area 5) 30-2b, reflected by the dichroic mirror DM21 and reflected towards the illumination light guide system 6 shown in FIG. 1 by the dichroic mirror DM22.

[Generation of Blue Light]

Corresponding to the rotation of the light transmission wheels 15-2 and 30-2 in the arrow A1 direction, the area 15-2b1 (area 2-1) in the second dichroic filter (area 2) 15-2b locates on the light path of ultraviolet rays. The ultraviolet rays are transmitted through the area 15-2b1. With this, the area 30-2a2 (area 4) in the third dichroic filter 30-2a locates in the light path of ultraviolet rays which are transmitted though the area 15-2b1 (area 2-1). Thereby, the ultraviolet rays which are transmitted through the area 15-2b1 are transmitted through the second dichroic filter 15-2b and area 30-2a2 (area 4) in the light-transmitting control wheel 30-2 and irradiate the wavelength converter 60. By the above ultraviolet rays, the wavelength converter 60 emits blue fluorescent light as blue light BL. The emitted blue light BL is reflected by the dichroic mirror DM23 and transmitted through the dichroic mirror DM22. Blue light BL is guided towards the illumination light guide system 6 in FIG. 1.

Embodiment 9

FIGS. 11A, 11B, 12A and 12B

In the above-described Embodiments 1 to 8 and modified examples thereof, green fluorescent light is generated from a single wavelength converter and single light-transmitting control wheel. In Embodiments 5 and 8, to generate fluorescent light of colors other than green such as red and blue fluorescent light, plural wavelength converters and light-transmitting control wheels are used. Therefore, in each embodiment, a single light-transmitting control wheel is used for generating single fluorescent light. However, the present invention is not always limited to the above. It is possible to use a single light-transmitting control wheel to generate plural kinds of fluorescent light.

Figure 11A:
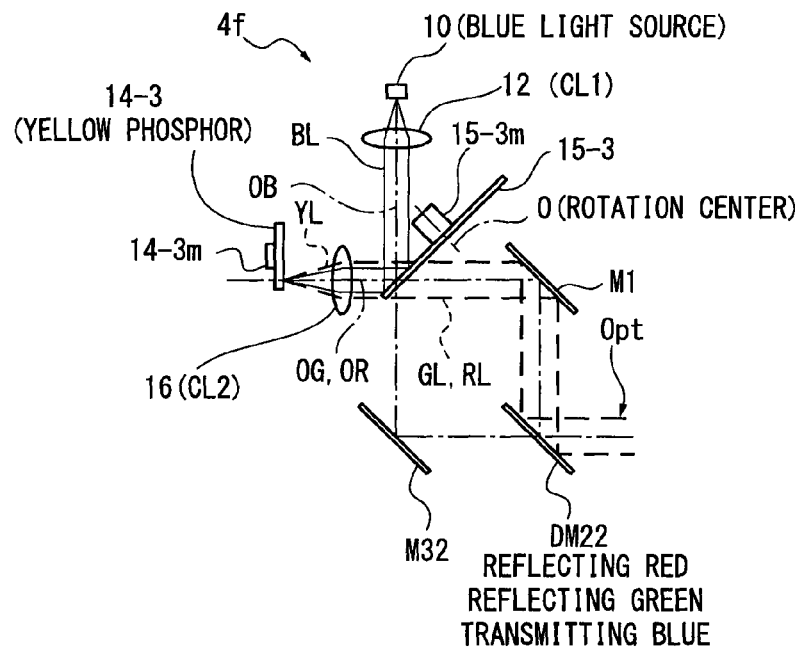
FIG. 11A and FIG. 11B are explanatory views of an illumination device according to Embodiment 9.
Figure 11B:
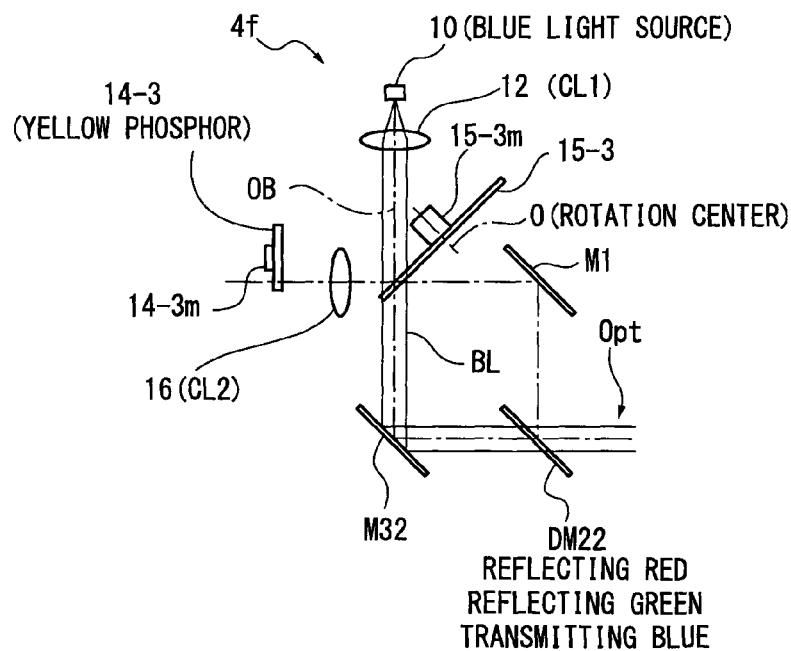
Figure 12A:
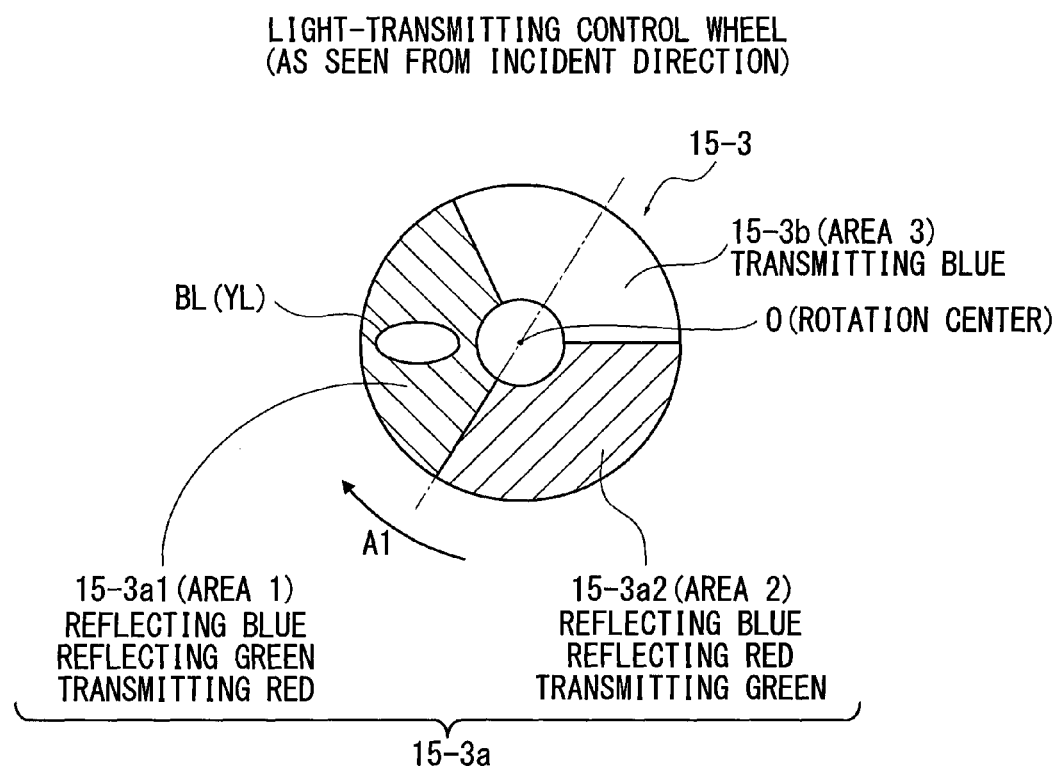
FIG. 12A is a plan view of a light-transmitting control wheel of the illumination devices shown in FIG. 11A and FIG. 11B, as viewed from the perpendicular direction to a surface of the light-transmitting control wheel and the incident direction of excitation light.

Embodiment 9 is an example in which one light-transmitting control wheel and one wavelength converter are used to generate plural kinds of fluorescent light (green and red fluorescent light). This is described as follows with reference to FIGS. 11 and 12. FIG. 11A is an optical view showing the emission light path of green and red light in an illumination device 4f. FIG. 11B is an optical view showing the emission light path of blue light. FIG. 12A is a plan view of the light-transmitting control wheel according to Embodiment 9, as viewed from the perpendicular direction to the surface thereof. FIG. 12B illustrates a sequence of an example of the emission timing of the illumination device 4*f* according to Embodiment 9.

[Constituent]

The illumination device 4*f* according to Embodiment 9 as shown in FIGS. 11A and 11B, similar to Embodiment 1, includes the solid-state light source 10, coupling lenses 12 (CL1) and 16 (CL2), and a mirror M1. In Embodiment 9, the light-transmitting control wheel 15 is changed to a light-transmitting control wheel 15-3 as shown in FIG. 12A. The wavelength converter 14 is also changed to a wavelength converter 14-3 provided with yellow phosphor generating yellow fluorescent light. Yellow fluorescent light includes green and red fluorescent light herein. In addition, the solid-state light source 11 of red light source is not used in Embodiment 9. The dichroic mirror DM1 is changed to a total reflection mirror M32. Further, in Embodiment 9, the dichroic mirror DM2 in Embodiment 1 is changed to a dichroic mirror DM22 which reflects red light RL and green light GL and transmits blue light BL.

As shown in FIG. 12A, the light-transmitting control wheel 15-3 includes; a first dichroic filter 15-3*a* which reflects excitation blue light BL and selects and transmits fluorescent light having a certain wavelength such as red or green; and a second dichroic filter 15-3*b* which transmits blue light BL. The second dichroic filter 15-3*b* only transmits blue light BL but it is more preferable if it reflects fluorescent light. The first dichroic filter 15-3*a* is equally divided into two in a circumferential direction. Thereby, the filter 15-3*a* includes an area 15-3*a*1 (area 1) and an area 15-3*a*2 (area 2). The area 15-3*a*1 (area 1) reflects blue light BL and green fluorescent light GL and transmits green fluorescent light. The area 15-3*a*2 (area 2) reflects blue light BL and red fluorescent light RL. In Embodiment 9, the second dichroic filter 15-3*b* is indicated as area 3.

For instance, the area 15-3*a*1 and the area 15-3*a*2 in the first dichroic filter 15-3*a*, and the second dichroic filter 15-3*b* are provided in the light-transmitting control wheel 15-3 so that they have an evenly divided area of 120 degrees in the 360-degree circumference of the wheel 15-3.

[Function]

The function of the illumination device f according to Embodiment 9 is described according to the color-generation sequence as shown in FIG. 12B.

The color-generation sequence in FIG. 12*b* is performed by the drive controller 3*c* in FIG. 1. The drive-controller 3*c* controls the solid-state light source 10 to be turned on continuously and controls the rotation of the light-transmitting control wheel 15-3.

The solid-state light source 10 emits blue dispersing laser light (excitation light). The dispersing laser light emitted from the light source 10 becomes a parallel blue light flux through the coupling lens 12 (CL1). The light flux enters the light-transmitting control wheel 15-3 (refer to FIG. 11).

[Generation of Red Light]

When the area 15-3*a*1 (area 1) in the first dichroic filter 15-3*a* locates on the excitation light path (blue light BL) of the light emitted from the solid-state light source 10, as shown in FIG. 11A, the light transmission wheel 15-3*a* reflects blue light towards the wavelength converter 14-3. The reflected blue light BL is concentrated on the wavelength converter 14-3 through the coupling lens 16 (CL2). The phosphor in the wavelength converter 14-3 is excited by the light and generates dispersing yellow fluorescent light YL. The dispersing yellow fluorescent light becomes a parallel yellow-fluorescent-light flux YL through the coupling lens 16 (CL2). The light flux enters the area 15-3*a*1 (area 1) in the first dichroic filter 15-3*a*. Herein, only red fluorescent light (red light RL) is transmitted through the area 15-3*a*1 (area 1), and light having other wavelength (green fluorescent light) is reflected. Thereby, only red light RL can be obtained. The transmitted red light RL is reflected by the mirror M1 and reflected towards the illumination light guide system 6 by the dichroic mirror DM22 (refer to FIG. 11A).

While the above is carried out, the drive controller 3*c* controls the driving motor 14-3*m* so that the wavelength converter 14-3 rotates at a certain velocity. With such rotation, the incident position of blue excitation light changes, so that the phosphor used in the wavelength converter 14-3 can be cooled while not being deteriorated.

[Generation of Green Light]

Corresponding to the rotation of the light-transmitting control wheel 15-3 in the arrow A1 direction, the area (area 2) 15-3*a*2 in the first dichroic filter 15-3*a* locates in the light path of blue light (excitation light) BL emitted from the solid-state light source 10. Blue light BL is reflected by the area 15-3*a*2 shown in FIG. 12A. The blue light BL is concentrated on the wavelength converter 14-3 through the coupling lens 16 (CL2). The phosphor in the wavelength converter 14-3 is excited by the light and generates dispersing yellow fluorescent light YL. The dispersing yellow fluorescent light YL becomes a flux of parallel yellow fluorescent light YL through the coupling lens 16 (CL2) and enters the area 15-3*a*2 (area 2) of the first dichroic filter 15-3*a*. Herein, only green fluorescent light (green light GL) is transmitted through the area 15-3*a* (area 2). Light having other wavelength (red fluorescent light) is reflected. Thereby, only green light GL can be obtained. Green light GL is reflected by the mirror M1 and reflected towards the illumination light guide system 6 in FIG. 1 by the dichroic mirror DM22 (refer to FIG. 11A)

[Generation of Blue Light]

Corresponding to the rotation of the light-transmitting control wheel 15-3 in the arrow A1 direction, the second dichroic filter (area 3) locates in the light path of blue light (excitation light) BL emitted from the solid-state light source 10. Herein blue light BL is transmitted through the second dichroic filter (area 3) 15-3*b*. The transmitted blue light B1 is reflected by the mirror M32, transmitted through the dichroic mirror DM22 and guided to the illumination light guide system 6 in FIG. 1 (refer to FIG. 11B).

In the illumination device 4*f* having the above-described constituent, as shown in FIG. 12A, every time the light-transmitting control wheel rotates one revolution, the areas 1, 2 and 3 locate in the light path in this order. Thereby, red light RL, green light GL, and blue light BL are generated and emitted in this order.

Accordingly, the solid-state light source 10 can be used as an excitation light source for generating fluorescent light and also used as the light source of blue light. Red and green fluorescent light can be generated by one light source. Therefore, the minimization and cost reduction of the device are accomplished due to the cut-down of light sources.

As described above, light having a certain wavelength is transmitted through the area 15-3*a*1 (area 1) and area 15-3*z*2 (area 2). Therefore, red light RL is obtained through the area 15-3*a*1 and green light GL is obtained through the area 15-3*a*2. In this manner, if only each color light can be obtained through each area, it is possible to set each area through which light having different wavelengths is transmitted, or it is possible to set each area through which light having the same wavelength in part is transmitted.

For instance, as the wavelength converter 14-3, phosphor which generates yellow fluorescent light YL having the wavelength bandwidth from 500 nm to 750 nm or the wavelength including this range is used. Herein, it is preferable that as red light RL, light having the wavelength bandwidth from 620 nm to 700 nm or the wavelength including the above range be transmitted through the area 15-3a1 (area 1). It is also preferable that as green light GL, light having the wavelength bandwidth from 510 nm to 575 nm or the wavelength including this range be transmitted through the area 15-3a2 (area 2).

Within the above wavelengths, it is possible for the wavelength of light to be set in a particular range to transmit through each area. Herein, desired red light can be obtained from red light having various color tones i.e. red light having yellow color tone, red light having purple color tone and so on. Similarly, desired green light can be obtained from green light having various color tones i.e. green light having blue color tone, green light having red or yellow color tone and so on.

Moreover, it is possible that light having a narrow range of wavelength bandwidth around 620 nm be transmitted through the area 15-3a1 where red light RL is obtained, and it is possible that light having narrow range of wavelength bandwidth around 550 nm be transmitted through the area 15-3a2 (area 2). Thereby, red light RL and green light GL having high purity in color can be obtained.

Following is an example in which light having overlapped wavelength is used: light having a wavelength bandwidth from 570 nm to 700 nm or the wavelength including this range is transmitted through the area 15-3a1 (area 1); and light having the wavelength from 490 nm to 600 nm or the wavelength including this range is transmitted through the area 15-3a2 (area 2). From such a constituent, red light and green light having a desired color tone can be obtained.

As described above, when generating red light RL and green light GL by transmitting or reflecting light by the light-transmitting control wheel, the wavelength of light for transmission and reflection can be decided respectively. Thereby, green light and red light having the desired color tone can be generated. Accordingly, the range in color tone of emission light can be expanded.

Embodiment 10

Figure 13A:
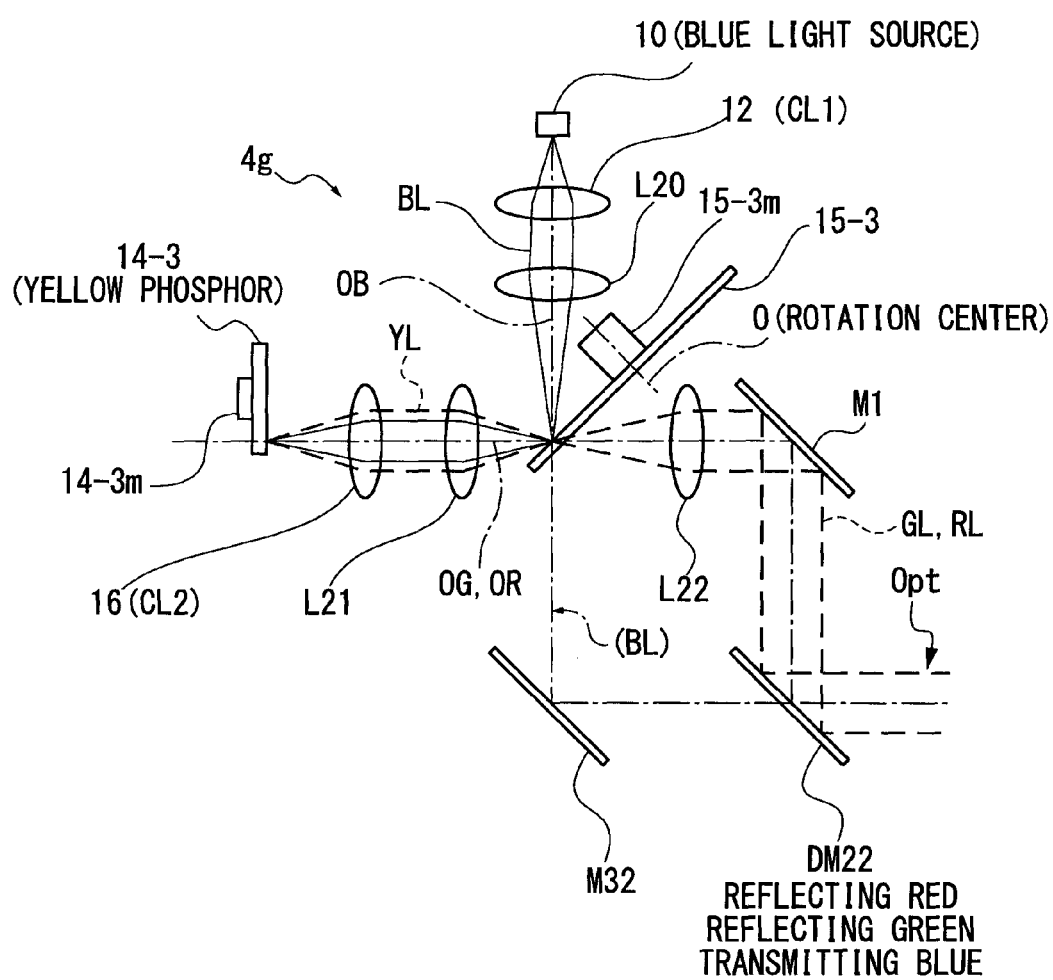
FIG. 13A and FIG. 13B are explanatory views showing an illumination device according to Embodiment 10 of the present invention.
Figure 13B:
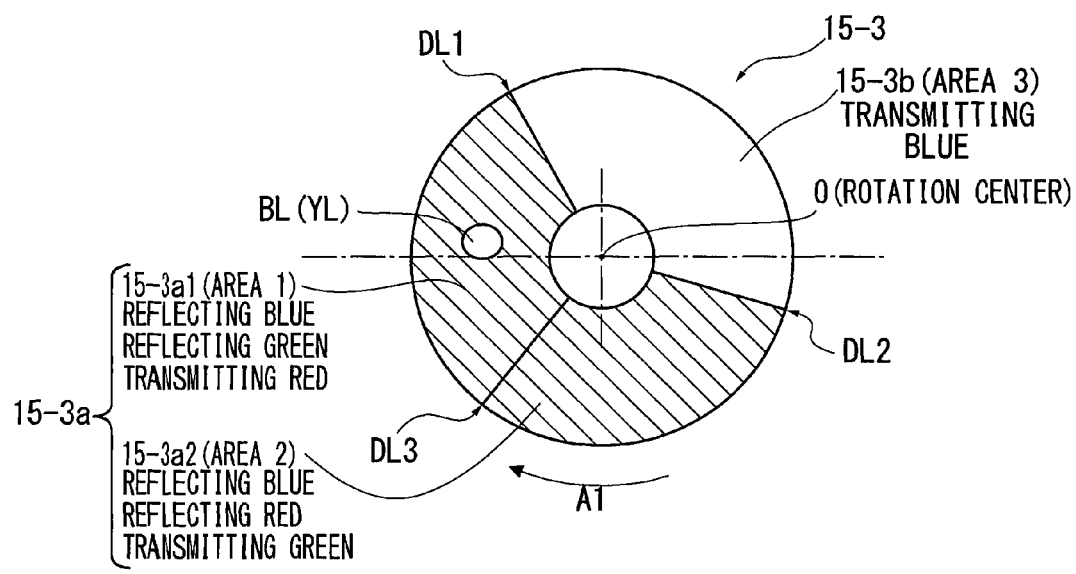

FIGS. 13A and 13B

Hereafter, a description regarding an illumination device according to Embodiment 10 will be given with reference to FIGS. 13A and 13B. FIG. 13A illustrates the construction of the illumination device 4g. FIG. 13B is a plan view of a light-transmitting control wheel 15-3 as viewed from the perpendicular direction to the surface thereof.

Embodiment 10 is an example in which blue light BL and yellow fluorescent light YL are concentrated when entering the light-transmitting control wheel 15-3. The illumination device according to Embodiment 10 shown in FIG. 13A includes: a light-condensing lens L20 disposed between a coupling lens 12 (CL1) and the light-transmitting control wheel 15-3; and a light-condensing lens L21 disposed between the coupling lens 16 (CL2) and the light-transmitting control wheel 15-3. The condensing lens L20 concentrates blue light BL and the condensing lens L21 concentrates yellow fluorescent light. Another configuration to the above is basically the same as that in the illumination device 4f according to Embodiment 9 as shown in FIG. 11. The function while generating blue light BL, green light GL and red light RL is similar to that of Embodiment 9. So the same numerals and characters as Embodiment 9 are used herein and the detailed description thereof is omitted.

As shown in FIG. 13B, the light-transmitting control wheel includes the first boundary part DL1 and the second boundary part DL2 as boundary lines between the first dichroic filter 15-3a and the second dichroic filter (area 3) 15-3b. The first dichroic filter 15-3a similarly includes the third boundary part DL3 between the area 15-3a1 (area 1) and the area 15-3a2 (area 2). When the blue light BL or the yellow fluorescent light YL pass through these boundary parts 1st to 3rd, from DL1 to DL3, that is, the area appears in the light path of the blue light BL changes from the area 1 to area 2 and area 3, a color-mixture time (spoke time) as described in Embodiment 2 may occur. Accordingly, in Embodiment 10, the blue light BL and the yellow fluorescent light YL are once concentrated by the light condensing lenses L20 and L21. The light is incident on the light-transmitting control wheel 15-3 while its light-flux width being small. Therefore the spoke time while the changing of areas can be shortened and the color-mixture time can be shortened. The purity of colors of the illumination device 4g increases more.

Embodiment 11

Figure 14A:
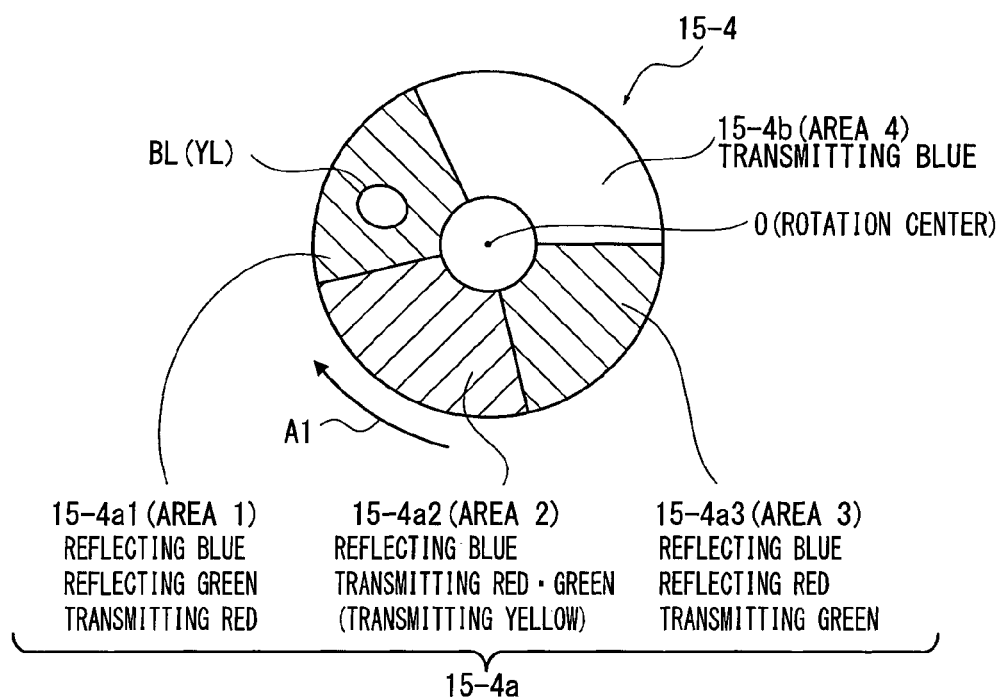
FIG. 14A and FIG. 14B are explanatory views showing an illumination device according to Embodiment 11 of the present invention.
Figure 14B:
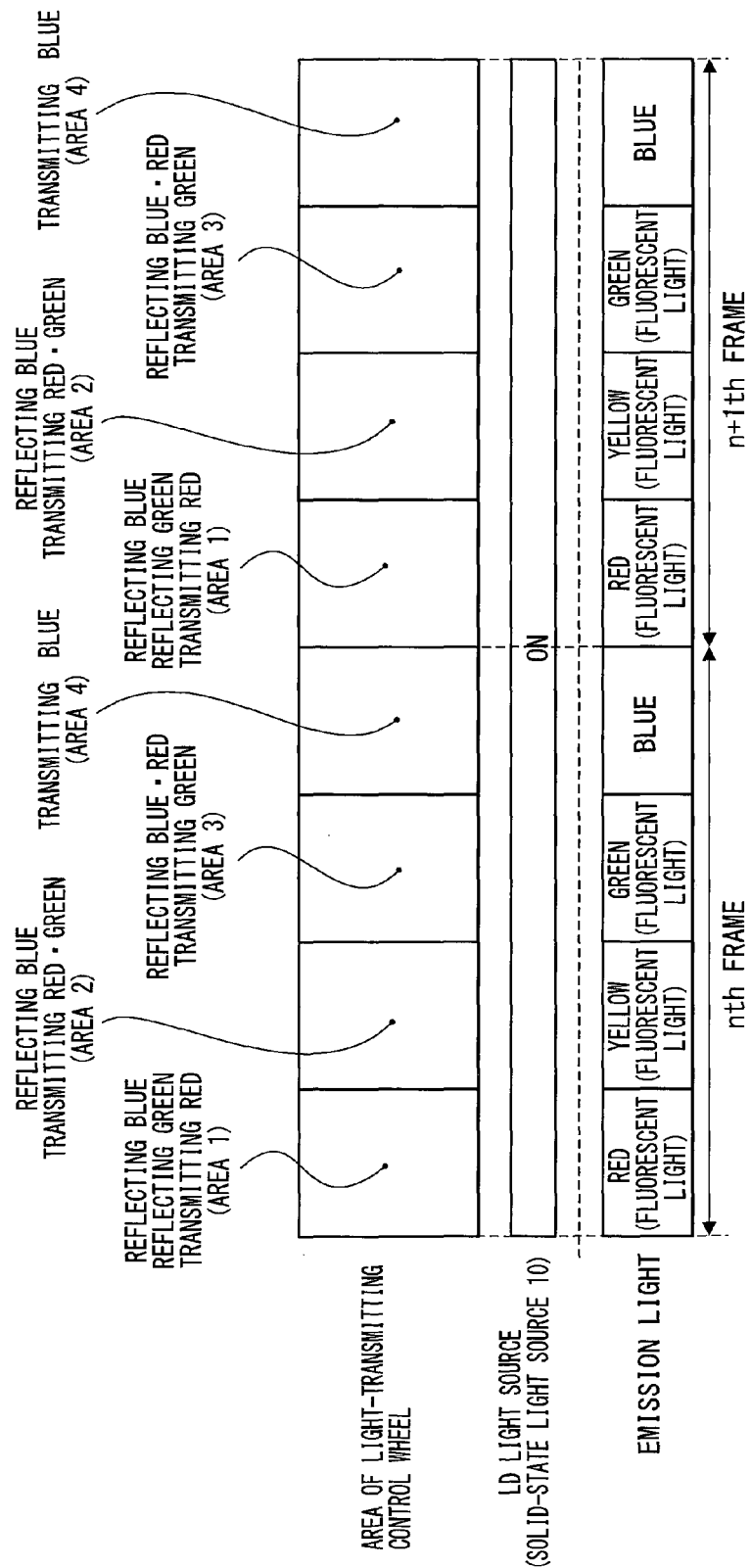

FIGS. 14A and 14B

Hereinafter, an illumination device according to Embodiment 11 is described with reference to FIGS. 14A and 14B. FIG. 14 is a plane view of the light-transmitting control wheel 15-4 included in the illumination device of Embodiment 11, as viewed from a perpendicular direction to the surface thereof. FIG. 14B is an explanatory view of an example of sequence of the light-emission timing in Embodiment 11.

The illumination device in Embodiment 11 has similar constituents to the illumination device 4g in Embodiment 10 except that the light-transmitting control wheel 15-3 in Embodiment 10 is changed to the light-transmitting control wheel 15-4 as shown in FIG. 14A. Accordingly, the same numerals and characters as Embodiment 10 are used herein to describe the similar constituents and the detailed description thereof is omitted.

In the light-transmitting control wheel 15-3 in the above-described Embodiments 9 and 10, the first dichroic filter 15-3a is equally divided into two areas. Then the dichroic filter 15-3 has the area 15-3a1 (area 1) and the area 15-3a2 (area 2). Each of green light GL and red light RL is generated through each of the areas and emitted therefrom. In Embodiment 11, the first dichroic filter further includes the area which generates yellow light (YL).

The light-transmitting control wheel 15-4 in Embodiment 11 includes a first dichroic filter 15-4a and the second dichroic filter 15-4b. The first dichroic filter 15-4a reflects blue light, and selects and transmits fluorescent light having a certain wavelength. The second dichroic filter 15-4b transmits blue light. Similar to Embodiment 9 and so on, the second dichroic filter just transmits blue light but it is more preferable if the filter 15-4b reflects fluorescent light.

In addition, the first dichroic filter 15-4a is divided equally into three areas in the circumferential direction. It includes a first area 15-4a1 (area 1) which reflects blue and green fluorescent light and transmits red fluorescent light, second area 15-4a2 (area 2) which reflects blue light and transmits red and green (yellow) light, and a third area 15-4a3 which reflects blue and red light and transmits green light. The area of the second dichroic filter 15-4b is indicated as an area 4 in Embodiment 11.

In Embodiment 11, the second dichroic filter 15-4b has about 120 degrees within 360 degrees of the light-transmitting control wheel 15-4. The first dichroic filter 15-4a has the remaining i.e. 240 degrees.

Hereafter, a description of a color generation sequence will be given. The generation of red color light on the area 1 (15-4a1); the generation of green light on the area 3 (15-4a); and the generation of blue light on the area 4 (15-4b) in the light-transmitting control wheel 15-4 in Embodiment 11 are similar to those in Embodiments 9 and 10, so the detailed description thereof is omitted. The following is a description of the control and the function thereof when generating yellow light YL.

[Generation of Yellow Light]

Corresponding to the rotation in the arrow A1 direction of the light-transmitting control wheel 15-4, the area 15-4a2 (area 2) in the first dichroic filter locates in the light path of the blue light (excitation light) BL emitted from the solid-state light source 10. Then, blue light BL is reflected by the area 15-4a2 (area 2) and concentrated on the wavelength converter 14-3 through the coupling lens 16 (CL2). The phosphor in the wavelength converter 14-3 is excited by the light and generates dispersing yellow fluorescent light. The dispersing yellow light becomes a parallel yellow light flux YL through the coupling lens 16 (CL2) and enters the area 15-4a2 (area 2) in the first dichroic filter 15-4a. The area 15-4a2 is configured to transmit green and red light, so that yellow fluorescent light YL which is a mixture of such light is transmitted through the area 15-4a2. Thus yellow light is obtained. The yellow light YL is reflected by the mirror M1 and reflected towards the illumination light guide system 6 shown in FIG. 1 by the dichroic mirror DM22.

As described above, in Embodiment 11, the areas 1 to 4 are located in the light path in series with respect to one revolution of the light-transmitting control wheel 15-4 as illustrated in FIG. 14B. Thereby red light (red fluorescent light) RL, yellow light (yellow fluorescent light) YL, green light (green fluorescent light) GL and blue light BL are generated in this order per frame.

Accordingly, because the emission light further includes yellow light YL in addition to the red light RL, green light GL and blue light BL, a brighter image can be accomplished and the range of color reproduction is increased.

Supplemental Description of Embodiments 9 to 11

In the above-described Embodiments 9 to 11, the areas 1-4 for generating each color in the light-transmitting control wheel have approximately the same sizes as each other. The emission time of each color light is set to be even. However, the present invention is not always limited to those. The emission efficiency in each color is different, so it is possible that the sizes of areas 1 to 4 be adjusted and the emission time be set per color so that white color can be obtained in total.

In Embodiments 9 to 11, the power of the LD light source (solid-state light source) is even in all colors. However, the power of the LD light source can be changed for each color. In this regard, the light emission according to the efficiency in each color can be carried out.

Embodiment 12

Figure 15A:
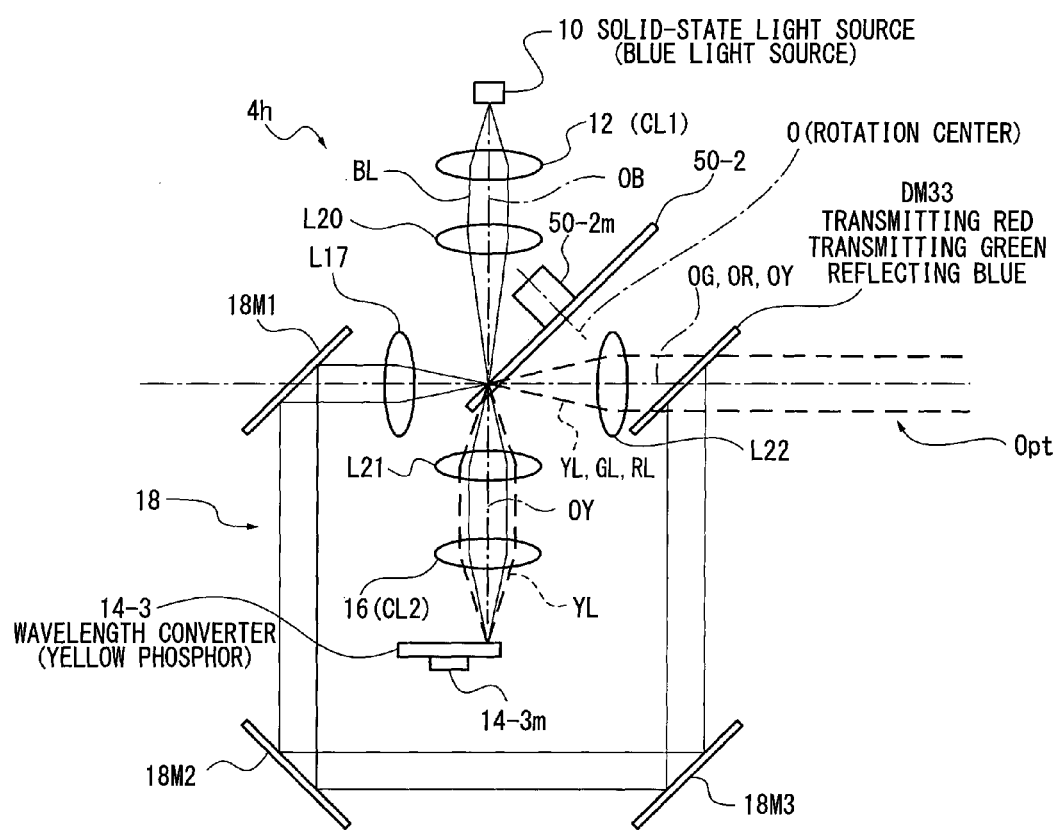
FIG. 15A is an optical view showing an illumination device according to Embodiment 12 of the present invention.
Figure 15B:
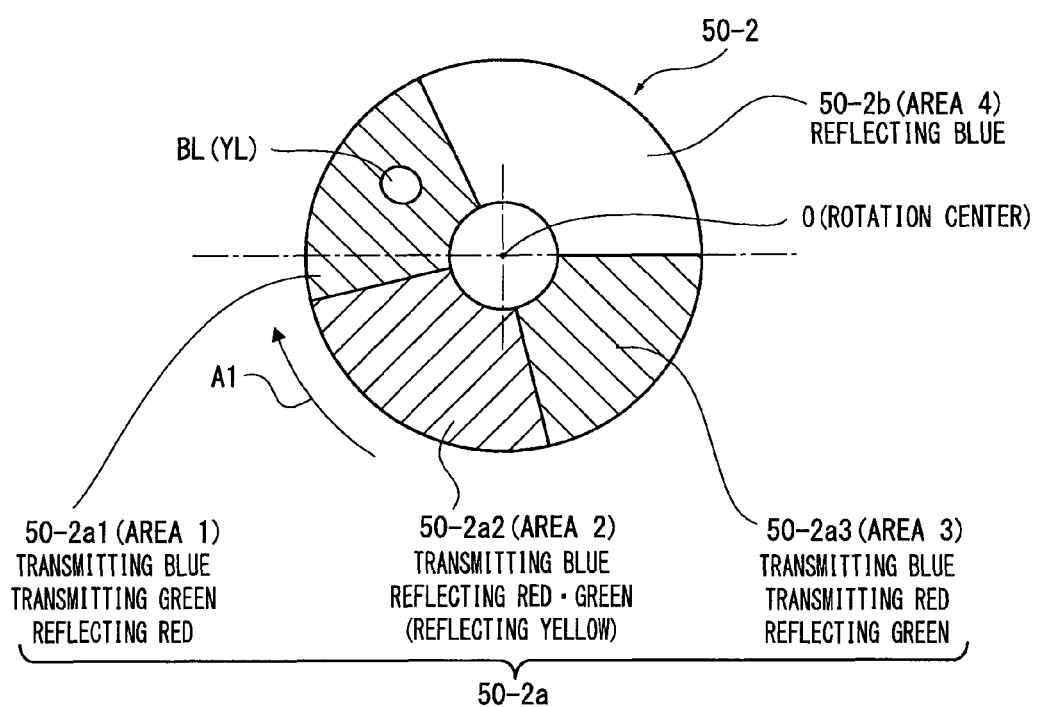
FIG. 15B is a plan view of a light-transmitting control wheel of the illumination device according to Embodiment 12 as shown in FIG. 15A, as viewed from the perpendicular direction of a surface of the wheel and the incident direction of excitation light.

FIGS. 15A and 15B

Hereafter, an illumination device 4h according to Embodiment 12 will be described with reference to FIGS. 15A and 15B. FIG. 15A is an optical view showing an illumination device 4h in Embodiment 12. FIG. 15B is a plan view of the light-transmitting control wheel 50-2 of Embodiment 12 as viewed from the perpendicular direction to the surface thereof.

In Embodiments 9 to 11, the wavelength converter 14-3 is disposed in the reflection light path of excitation light (blue light BL) emitted from the solid-state light source 10. On the other hand, in Embodiment 12, the wavelength converter 14-3 is disposed in the transmission light path of the excitation light (blue light BL) from the light source 10 and the alternative light path 18 is disposed in the reflection light path of blue light BL.

The illumination device 4h according to Embodiment 12 shown in FIG. 15A has similar constituents to the illumination device 4d of Embodiment 7 shown in FIG. 9A except for the following difference. Therefore the same numerals and characters as Embodiment 7 are used herein and the detailed description is omitted. In Embodiment 12, the wavelength converter 14 and the light-transmitting control wheel 50 in Embodiment 7 are changed to a wavelength converter 14-3 and a light-transmitting control wheel 50-2. The wavelength converter 14-3 generates yellow fluorescent light. The light-transmitting control wheel 50-2 emits green light GL, red light RL and yellow light YL. The dichroic mirror in Embodiment 7 is changed to the dichroic mirror DM33 which transmits red light RL and green light GL and reflects blue light BL. Furthermore, the solid-state light source 11 of the red light source and the dichroic mirror DM4 are omitted in Embodiment 12.

The light-transmitting control wheel 50-2 of Embodiment 12 shown in FIG. 15B includes a first dichroic filter 50-2a as the first filter and a second dichroic filter 50-2b as the second filter. The first dichroic filter 50-2a transmits blue excitation light BL and selects and reflects light having a certain wavelength such as green, red or yellow which includes those colors. The second dichroic filter only reflects blue light BL but it is more appropriate if it transmits fluorescent light.

The first dichroic filter 50-2a is equally divided into three areas in the circumferential direction. Thus, the first dichroic filter 50-2a includes: the area 50-2a1 (area 1) which transmits blue and green light and reflects red light; area 50-2a2 (area 2) which transmits blue light and reflects red and green light; and area 50-2a3 (area 3) which transmits blue and red light and reflects green light. The area of the second dichroic filter 50-2b is indicated as area 4 in Embodiment 12.

[Generation of Red Light]

In Embodiment 12, corresponding to the rotation of the light-transmitting control wheel 50-2 in the arrow A1 direction, when the area 50-2a1 (area 1) locates on the light path of blue light BL emitted from the solid-state light source 10, blue light BL is transmitted through the area 50-2a1 (area 1) and enters the wavelength converter 14-3. Thereby, yellow fluorescent light YL is generated from the wavelength converter 14-3. Yellow fluorescent light YL enters the area 50-2a1 (area 1) and the red light RL therein is reflected by the area 1 after being selected. Red light RL is transmitted through the dichroic mirror DM33 and guided to the illumination light guide system 6 shown in FIG. 1.

[Generation of Yellow Light]

When the area 50-2a2 (area 2) locates on the light path of blue light BL, blue light is transmitted through the area 50-2a2 and enters the wavelength converter 14-3. Then, yellow fluorescent light generated by the wavelength converter 14-3 enters the area 50-2a1 and red and green light therein i.e. yellow light YL is reflected after being selected. Thereafter, yellow light YL is transmitted through the dichroic mirror DM33 and guided to the illumination light guide system 6 shown in FIG. 1.

[Generation of Green Light]

When the area 50-2a3 (area 3) locates in the light path of blue light BL, blue light BL is transmitted through the area 50-2a3 and enters the wavelength converter 14-3. Then, yellow light generated from the wavelength converter 14-3 enters area 50-2a3 (area 3) and green light GL is reflected after being selected. Thereafter, green light GL is transmitted through the dichroic mirror DM3 and guided to the illumination light guide system 6 shown in FIG. 1.

[Generation of Blue Light]

When the second dichroic filter (area 4) 50-2b locates in the light path of blue light BL, blue light BL is reflected by the dichroic filter 50-2b, and enters the alternative light path 18. Blue light BL enters dichroic mirror DM33 through the alternative light path, is reflected by the dichroic filter DM33 and guided to the illumination light guide system 6 shown in FIG. 1.

Supplemental Description 1

FIGS. 1-4B, 7A-8A, 9A-11B, 13A, 13B, 15A and 15B

An illumination device according to embodiments of the present invention includes an excitation light source (solid-state light source 10, 10-a and 40) emitting excitation light, a wavelength converter (14, 14-1, 14-2 and 14-3) which generates fluorescent light having a wavelength different from that of the excitation light by the excitation of the excitation light, and a light path-splitting member (light-transmitting control wheel 15, 15', 15-1, 15-2, 15-3, 15-4, 50 and 50-2) which includes a first filter (first dichroic filter 15a, 15a', 15-1a, 15-2a, 50a and 50-2a) and a second filter (second dichroic filter 15b, 15b', 15-1b, 15-2b, 50b and 50-2b) arranged to alternately come across the light path of excitation light, wherein the first filter reflects one of excitation light and the fluorescent light and transmits the other of the excitation light and the fluorescent light, the second filter transmits light reflected by the first filter and reflects light transmitted through the first filter, and the wavelength converter is disposed in a reflection light path or a transmission light path of the excitation light.

According to the above configuration, light having different wavelengths can be generated from a single light source at the same time that the simplification of phosphor which emits light having a wavelength different from that of excitation light is achieved.

Moreover, the light having different wavelengths can be used as the light source of a color projector applied for two colors of three primary colors, red, blue and green.

Herein, light-irradiating phosphor (wavelength converter) is called excitation light. The phosphor includes the above-described wavelength converter 14, 14-1, 14-2, 14-3, 31, 31-2, 60 in the present embodiments. The excitation light includes light having the wavelength of blue or ultraviolet rays, but it is possible to use light other than the above.

The phosphor (wavelength converter) is excited by irradiation of excitation light. Thereby light converted to have a wavelength different from that of the excitation light is generated from the phosphor. The converted light generated from the phosphor is called fluorescent light or excited light.

Supplemental Description 2

FIGS. 1-4B, 7A-8A, 9A-11B, 13A, 13B, 15A and 15B

An illumination device according to embodiments of the present invention includes a light path-combining element (mirror M1, M31, M32, 18M1, 18M2, 18M3, Dichroic mirror DM1, DM2, DM3, DM4, DM21, DM22, DM23 and DM33) which combines an emission light path of the excitation light and an emission light path of the fluorescent light.

According to the above configuration, the excitation light and the fluorescent light each having a different wavelength are guided towards the image-forming element 5 such as DMD per certain time. Therefore, a monochrome image corresponding to each color can be generated.

Supplemental Description 3

FIGS. 1-4B, 7A-8A, 9A-11B, 13A, 13B, 15A and 15B

An illumination device according to embodiments of the present invention includes an optical element (coupling lens CL2, CL3, 16 and 32) which emits fluorescent light generated from the wavelength converter towards the light path-splitting member (light-transmitting control wheel 15, 15', 15-1, 15-2, 15-3, 15-4, 50 and 50-2), the optical member disposed between the wavelength converter and the light path-splitting member.

According to the above configuration, fluorescent light dispersed from the wavelength converter can be efficiently incident on the light path-splitting member.

Supplemental Description 4

<Guiding-Light Path of Blue Transmission Light>
FIGS. 1-2B

An illumination device according to embodiments of the present invention includes the excitation light source (solid-state light source 10) which emits blue light as the excitation light; the wavelength converter (wavelength converter 14) which includes phosphor generating the green fluorescent light as excited light (fluorescent light) by the excitation of the blue light; the first filter (first dichroic filter 15a) in the light path-splitting member reflects the blue light and transmits the fluorescent light and the second filter (second dichroic filter 15b) transmits the blue light; and the wavelength converter 14 is disposed in the reflection light path of the first filter which reflects the blue light.

According to the above configuration, blue light and light having a wavelength of green can be emitted through the emission light path Opt towards the irradiation surface per each time. Therefore, at least blue and green light of the three primary colors can be generated and it can be used as a light source of a projector. In particular, the excitation light source and the blue light source can be unified so the number of light sources and the cost thereof are reduced. Thus, the miniaturization of the device and cost reduction can be achieved.

Supplemental Description 5

<Guiding-Light Path and Alternative Light Path 18> FIGS. 9A, 9B, 15A and 15B

An illumination device according to embodiments of the present invention includes the excitation light source (solid-state light source 10) emitting blue light as the excitation light, the wavelength converter (14-1, 14-3) including phosphor generating the fluorescent light having green color by the excitation of the blue light, the light path-splitting member being configured to transmit the blue light and reflect the fluorescent light by the first filter (first dichroic filter 50a, 50-2a), and reflect the blue light by the second filter (second dichroic filter 50b, 50-2b), and the wavelength converter being disposed in the transmission light path of the first filter which transmits the blue light of the first filter.

In this configuration, because a guiding-light path (alternative light path 18) is provided to guide blue light reflected by the second filter to the emission light path Opt, the blue light can be emitted through the path. In addition, fluorescent light including green color is generated from the wavelength converter by blue light transmitted through the first filter. Green fluorescent light is selected from the fluorescent light and reflected by the first filter. Thus green fluorescent light can be emitted through the emission light path Opt According to the above configuration, blue and green light of three primary colors can be generated and used as the light source for the projector. In particular, the excitation light source and the blue light source can be unified so that the number of light sources and the cost thereof are reduced. Thus, the miniaturization of the device and cost reduction can be achieved.

Supplemental Description 6

FIGS. 12A, 13B and 14A

In an illumination device according to embodiments of the present invention, the first filter (first dichroic filter 15-3a, 15-4a) is divided into at least two areas (area 15-3a1, 15-3a2, 15-4a1, 15-4a2 and 15-4a3) each of which transmits the fluorescent light having a predetermined wavelength.

According to the above configuration, light having not only blue and green of the three primary colors but also the other color can be generated, and it can be used as the light source for the projector. In particular, the excitation light source and the blue light source can be unified so the number of light sources and the cost thereof are reduced. Thus, the miniaturization of the device and cost reduction can be achieved.

Supplemental Description 7

FIGS. 12A, 13B and 14A

In addition, an illumination device according to embodiments of the present invention includes the first filter (the first dichroic mirror 15-3a, 15-4a and 50-2a) which is divided into at least an area (area 15-3a2 and 15-4a3) which transmits fluorescent light having green color and an area which transmits red light (area 15-3a1 and 15-4a1). Furthermore, the illumination device also includes an area (area 15-4a2) which transmits yellow light.

According to the above configuration, light of the three primary colors, blue, green and red can be generated, and it can be used as the light source for the projector. By generating yellow light in addition, a brighter image can be generated and the range of color reproduction expands. In particular, the excitation light source and the blue light source can be unified so the number of light sources and the cost thereof are reduced. Thus, the miniaturization of the device and cost reduction can be achieved.

Supplemental Description 8

FIG. 7A

An illumination device according to embodiments of the present invention includes a second wavelength converter 31 and a second light path-splitting member 30. The second wavelength converter 31 includes second phosphor which generates second fluorescent light (red light, for example) having a wavelength different from that of the first fluorescent light (fluorescent light having green color, for example) from the wavelength converter by the excitation of blue light emitted from the excitation light source (solid-state light source 10). The second light path-splitting-member 30 includes a third filter (fourth dichroic filter 30b) which reflects the blue light transmitted through the second filter in the light path-splitting member 15 towards the second wavelength converter 31, and transmits the second fluorescent light generated by the second wavelength converter 31.

According to the above configuration, light of the three primary colors, blue, green and red can be generated from the single light source (solid-state light source 10), and it can be used as the light source for the projector. In particular, the excitation light source and the blue light source can be unified so the number of light sources and the cost thereof are reduced. Thereby, the miniaturization of the device and cost reduction can be achieved.

Supplemental Description 9

FIGS. 1, 2A-2B, 4A and 4B

An illumination device according to embodiments of the present invention includes the first light source (solid-state light source 10) emitting the blue light as the excitation light and a second light source (solid-state light source 11) emitting the light having a wavelength different from that of the excitation light. The second light source is turned off for at least a predetermined period while the excitation light source is turned on, and emits the excitation light or the fluorescent light generated from the wavelength converter on the emission light path. Thereby, light from the first light source (blue light), light from the second light source (red light) and fluorescent light (green light) can be obtained.

According to the above configuration, red, blue and green light of the three primary colors can be generated, and it can be used as the light source for the projector. In particular, the excitation light source and the blue light source can be unified so the number of light sources and the cost thereof are reduced. Thus, the miniaturization of the device and cost reduction can be achieved.

Supplemental Description 10

FIG. 5C

In an illumination device according to embodiments of the present invention, the excitation light source (solid-state light source 10) is turned off and the second light source (solid-state light source 11) is turned on when the first filter (first dichroic filter 15a') and the second filter (second dichroic filter 15b') change in the excitation light path.

According to the above configuration, the mixture of colors can be prevented and the ideal elemental colors can be obtained. Thus, the purity of colors in light is increased.

Supplemental Description 11

In an illumination device according to embodiments of the present invention, the excitation light source is turned on and the second light source is also turned on when the first filter and the second filter change in the excitation light path.

According to the above configuration, because both of the first and second light sources are turned on when the first and second filters change with each other, a mixture of colors occurs. However, by using the color-mixture time positively, brighter light can be obtained from the rotation of one revolution of the light-transmitting control wheel, compared with the case without the time of color mixture.

Supplemental Description 12

<Ultraviolet Rays> FIGS. 10A-10C

In an illumination device according to embodiments of the present invention, the excitation light source (solid-state light source 10a) emits ultraviolet rays as the excitation light. The wavelength converter includes a first wavelength converter 14-2 and a second wavelength converter 31-2. The light path-splitting member includes a first light path-splitting member (light-transmitting control wheel 15-2), and a second light path-splitting member (light-transmitting control wheel 30-2). The first wavelength converter 14-2 includes a first phosphor generating a first fluorescent light (green fluorescent light, for example) having a wavelength different from that of the ultraviolet rays. The second wavelength converter 31-2 includes a second phosphor generating a second fluorescent light (red light, for example) having a wavelength different from those of the ultraviolet rays and the first fluorescent light. The first light path-splitting member (light-transmitting control wheel 15-2) includes a first filter (first dichroic filter 15-2a) reflecting the ultraviolet rays towards the first wavelength converter and transmitting the first fluorescent light emitted from the first wavelength converter, and a second filter (second dichroic filter 15-2b) transmitting the ultraviolet rays. The first and second filters are arranged to alternately come across the light path of the ultraviolet rays. The second light path-splitting member (light-transmitting control wheel 15-2) reflects the ultraviolet rays transmitted through the second filter towards the second wavelength converter and transmits the second fluorescent light generated from the second wavelength converter.

According to the above configuration, blue and green light of the three primary colors can be generated from a single solid-state light source and it can be used as the light source for the projector. Thus the number of light sources and the cost thereof are reduced. Therefore, the miniaturization of the device and cost reduction can be achieved, compared with the case in which the light sources for blue and green light are provided separately.

Supplemental Description 13

<Ultraviolet Rays> FIGS. 10A-10C

In an illumination device according to embodiments of the present invention, the second light path-splitting member (light-transmitting control wheel 30-2) includes a third filter (third dichroic filter 30-2a) which transmits the ultraviolet rays and a fourth filter which reflects the ultraviolet rays and a fourth filter (fourth dichroic filter 30-2b). The third and fourth filters are arranged to alternately come across the light path of the ultraviolet rays which are transmitted through the second filter (second dichroic filter 15-2b) of the first light path-splitting member (light-transmitting control wheel 15-2). The illumination device further includes a third wavelength converter 60 in the light path of the ultraviolet rays which are transmitted through the third filter in the second light path-splitting member. The third wavelength converter 60 includes third phosphor which generates third fluorescent light (blue fluorescent light, for example) having a wavelength different from those of the first fluorescent light (green fluorescent light, for example) and the second fluorescent light (red fluorescent light, for example).

According to the above configuration, blue, green and red light of the three primary colors can be generated from a single light source and it can be used as the light source of the projector. Thus the number of light sources and the cost thereof are reduced. Therefore, the miniaturization of the device and cost reduction can be achieved, compared with the case in which the light sources for blue, green and red light are provided separately.

Supplemental Description 14

<Light Concentration> FIGS. 4A, 4B, 9A-10C, 13A, 13B, 15A and 15B

An illumination device according to the present invention includes a light-condensing element (light-condensing lens L20) which concentrates the excitation light emitted from the excitation light source (solid-state light sources 10 and 10a) on the light path-splitting member (light-transmitting control wheel 15, 50, 15-3 and 50-2), disposed between the excitation light source and the light path-splitting member.

According to the above configuration, the color mixing time is shortened by concentrating light once on the light-transmitting control wheel. Thus the purity in color can be increased. Furthermore the light-transmitting control wheel can be downsized so that the miniaturization of the device can be achieved.

Supplemental Description 15

<Light Concentration> FIGS. 4A, 4B, 9A-10C, 13A, 13B, 15A and 15B

An illumination device according to the present invention includes a light-condensing element (light-condensing lens L21) which concentrates the fluorescent light generated by the wavelength converter on the light path-splitting member (light-transmitting control wheel 15, 50, 15-3 and 50-2), disposed between the wavelength converter 14, 14-3 and the light path-splitting member.

According to the above configuration, light having green and red color is concentrated once on the light-transmitting control wheel so that the color mixing time can be shortened and the purity in color is increased. Furthermore the light-transmitting control wheel can be downsized, so the miniaturization of the device can be achieved.

Supplemental Description 16

Projector

A projector according to the present invention includes an image generator (image-forming element 5) which is irradiated by light generated from the illumination device (illumination device 4, 4a, 4b, 4c, 4d, 4e, 4f, 4g and 4h) and a projection lens 7 which magnifies and projects an image from the image information modulated by the image generator. As a projector incorporating such an illumination device in the present invention, for example, there are a projector which magnifies and projects the image to a projection surface such as a screen, and a projector as an exposure device which exposes a circuit pattern on a wafer during the production process of the semiconductor device.

According to the above configuration, blue, green and red light of the three primary colors can be generated from a single light source and it can be used as the light source of the projector. Thus the number of light sources and the cost thereof are reduced. Therefore, the miniaturization of the device and cost reduction can be achieved.

In the illumination device in which blue light emitted from the light source is used as excitation light, the emission light is split into reflection light and transmission light by the light-transmitting control wheel. Herein, blue light is used as reflection light or transmission light and the other light is used as excitation light. The light generated from the wavelength converter is used as excitation light. In this regard, a single excitation light source is needed, namely the excitation light source and the irradiation light source can be unified. Therefore the number of light sources can be reliably reduced.

Supplemental Description 17

Illumination Method

An illumination method according to embodiments of present invention include: irradiating excitation light emitted from an excitation light source (solid-state light source 10, 10a and 40) and fluorescent light having a wavelength different from that of the excitation light and being generated from a wavelength converter 14, 14-1, 14-2, 14-3, 31, 31-2 and 60 excited by the excitation light to an illuminated part, wherein a first filter (first dichroic filter 15a, 15a', 15-1a, 15-2a, 15-3a, 15-4a, 50a and 50-2a) which reflects one of the excitation light and the fluorescent light and transmits the other and a second filter (second dichroic filter 15b, 15b', 15-1b, 15-2b, 15-3b, 15-4b, 50b and 50-2b) which transmits light reflected by the first filter or reflects light transmitted through the first filter are included. The first and second filters are arranged to alternately come across a light path of the excitation light and generate fluorescent light having a wavelength different from that of the excitation light by irradiating the excitation light to the wavelength converter disposed in a reflection or a transmission light path of the excitation light.

According to the above method, phosphor which emits light having a wavelength different from that of excitation light can be simplified at the same time as generating a plurality of light having different wavelengths from a single light source.

Moreover, at least light having two colors of the three primary colors can be used as the light source for the projector. In this regard, the number of light sources and the cost thereof are reduced. Therefore, the miniaturization of the device and cost reduction can be achieved, compared with the case in which the light sources for blue, green and red light are provided separately.

Supplemental Description 18

In an illumination method according to embodiments of the present invention, the excitation light source (solid-state light source 10 and 40) generates blue light as the excitation light. The wavelength converter 14, 14-1, 14-2 and 14-3 generates fluorescent light having green color by the excitation of the blue light and emits red light from a second light source (solid-state light source 11) which is different from that of the excitation light source. The second light source is turned off for at least a predetermined period while the excitation light is turned on and emits the blue light or the fluorescent light having green color generated by the wavelength converter through an emission light path. The second light source is turned on for at least a predetermined period while the excitation light is turned off and emits red light emitted from the second light source through emission light path.

According to the above method, blue, green and red light of the three primary colors can be generated from a single light source and it can be used as the light source of the projector. Thus the number of light sources and the cost thereof are reduced. Therefore, the miniaturization of the device and cost reduction can be achieved, compared with the case in which the light sources for blue, green and red light are provided separately.

CROSS-REFERENCE TO RELATED APPLICATIONS

The present application is based on and claims priority from Japanese Patent Application Numbers 2012-204918, filed Sep. 18, 2012, and 2013-093578, filed Apr. 26, 2013, the disclosures of which are hereby incorporated by reference herein in their entireties.

The invention claimed is:

1. An illumination device, comprising:
an excitation light source which emits excitation light;
a wavelength converter which generates fluorescent light having a wavelength different from that of the excitation light through the excitation of the excitation light; and
a light path-splitting member including a first filter and a second filter arranged to alternately come across a light path of the excitation light, wherein
the first filter reflects one of the excitation light and the fluorescent light and transmits the other of the excitation light and the fluorescent light, and the second filter transmits light reflected by the first filter and reflects light transmitted through the first filter;
the wavelength converter is disposed in a reflection light path or a transmission light path of the excitation light;
the excitation light source emits blue light as the excitation light;
the wavelength converter includes phosphor generating the fluorescent light having green color by the excitation of the blue light;
the first filter in the light path-splitting member reflects the blue light and transmits the fluorescent light and the second filter transmits the blue light; and
the wavelength converter is disposed in the reflection light path of the first filter which reflects the blue light.

2. The illumination device according to claim 1, wherein the first filter is divided into at least two areas each of which transmits the fluorescent light having a predetermined wavelength.

3. The illumination device according to claim 1, wherein the first filter is divided into at least an area which transmits light having green color and an area which transmits light having red color from fluorescent light.

4. The illumination device according to claim 1, further comprising:
a second wavelength converter; and
a second light path-splitting member, wherein
the second wavelength converter includes second phosphor which generates second fluorescent light having a wavelength different from that of the fluorescent light from the wavelength convertor by the excitation of the blue light; and
the second light path-splitting-member includes at least a third filter which reflects the blue light towards the second wavelength converter after being transmitted through the second filter in the light path-splitting member, and transmits the second fluorescent light generated by the second wavelength converter.

5. An illumination device, comprising:
an excitation light source which emits excitation light;
a wavelength converter which generates fluorescent light having a wavelength different from that of the excitation light through the excitation of the excitation light; and
a light path-splitting member including a first filter and a second filter arranged to alternately come across a light path of the excitation light, wherein
the first filter reflects one of the excitation light and the fluorescent light and transmits the other of the excitation light and the fluorescent light, and the second filter transmits light reflected by the first filter and reflects light transmitted through the first filter;
the wavelength converter is disposed in a reflection light path or a transmission light path of the excitation light;
the excitation light source emits blue light as the excitation light;
the wavelength converter includes phosphor generating the fluorescent light having green color by the excitation of the blue light;
the light path-splitting member is configured to transmit the blue light and reflect the fluorescent light by the first filter, and reflect the blue light by the second filter; and
the wavelength converter is disposed in the transmission light path of the first filter which transmits the blue light.

6. An illumination device, comprising:
an excitation light source which emits excitation light;
a wavelength converter which generates fluorescent light having a wavelength different from that of the excitation light through the excitation of the excitation light; and
a light path-splitting member including a first filter and a second filter arranged to alternately come across a light path of the excitation light, wherein
the first filter reflects one of the excitation light and the fluorescent light and transmits the other of the excitation light and the fluorescent light, and the second filter transmits light reflected by the first filter and reflects light transmitted through the first filter; and
the wavelength converter is disposed in a reflection light path or a transmission light path of the excitation light, and the illumination device further includes
a second light source which emits light having a wavelength different from that of the excitation light, wherein
the second light source is turned off for at least a predetermined period while the excitation light source is turned on, and emits the excitation light or the fluorescent light generated from the wavelength converter; and
the second light source is turned on for at least a predetermined period while the excitation light source is turned off, and emits the light emitted from the second light source towards the emission light path.

7. The illumination device according to claim 6, wherein the excitation light source is turned off and the second light source is turned on when the first filter and the second filter change in the excitation light path.

8. The illumination device according to claim 6, wherein the excitation light source is turned on and the second light source is turned on when the first filter and the second filter change in the excitation light path.

9. An illumination device, comprising:
an excitation light source which emits excitation light;
a wavelength converter which generates fluorescent light having a wavelength different from that of the excitation light through the excitation of the excitation light; and
a light path-splitting member including a first filter and a second filter arranged to alternately come across a light path of the excitation light, wherein
the first filter reflects one of the excitation light and the fluorescent light and transmits the other of the excitation light and the fluorescent light, and the second filter transmits light reflected by the first filter and reflects light transmitted through the first filter;
the wavelength converter is disposed in a reflection light path or a transmission light path of the excitation light;
the excitation light source emits ultraviolet rays as the excitation light;
the wavelength converter includes a first wavelength converter and a second wavelength converter, the first wavelength converter including a first phosphor generating first fluorescent light having a wavelength different from that of the ultraviolet rays by the excitation of the ultraviolet rays, and the second wavelength converter including a second phosphor generating second fluorescent light having a wavelength different from those of the ultraviolet rays and the first fluorescent light by the excitation of the ultraviolet rays; and
the light path-splitting member includes a first light path-splitting member and a second light path-splitting member, the first light path-splitting member including a first filter reflecting the ultraviolet rays towards the first wavelength converter and transmitting the first fluorescent light emitted from the first wavelength converter and a second filter transmitting the ultraviolet lays, the first and second filters being arranged to alternately come across the light path of the ultraviolet rays, the second light path-splitting member reflecting the ultraviolet rays transmitted through the second filter towards the second wavelength converter and transmitting the second fluorescent light generated from the second wavelength converter.

10. The illumination device according to claim 9, wherein
the second light path-splitting member includes a third filter transmitting the ultraviolet rays and a fourth filter reflecting the ultraviolet rays; and
the third and fourth filters are arranged to alternately come across the light path of the ultraviolet rays transmitted through the second filter of the first light path-splitting member;
the illumination device further comprising:
a third wavelength converter including third phosphor generating third fluorescent light having a wavelength different from those of the first and second fluorescent light by the excitation of the ultraviolet rays in the light path of the ultraviolet rays transmitted through the third filter in the second light path-splitting member.

11. An illumination method, comprising:

irradiating excitation light emitted from an excitation light source and fluorescent light having a wavelength different from that of the excitation light generated by a wavelength converter excited by the excitation light to an illuminated part, wherein:

a first filter, which reflects one of the excitation light and the fluorescent light and transmits the other of the excitation light and the fluorescent light, and a second filter, which transmits light reflected by the first filter or reflects light transmitted through the first filter, are arranged to alternately come across a light path of the excitation light;

the fluorescent light having a wavelength different from that of the excitation light is generated by the irradiation of the excitation light to the wavelength converter which is disposed in a reflection path or a transmission light path of the excitation light;

the excitation light source emits blue light as the excitation light;

the wavelength converter generates fluorescent light having green color by the excitation of the blue light, and emits red light from a second light source which is different from that of the excitation light source;

the second light source is turned off for at least a predetermined period while the excitation light source is turned on and emits the blue light or the fluorescent light having green color generated by the wavelength converter through an emission light path; and the second light source is turned on for at least a predetermined period while the excitation light source is turned off and emits red light emitted from the second light source through the emission light path.

* * * * *